(12) United States Patent
Kaneko et al.

(10) Patent No.: US 10,845,808 B2
(45) Date of Patent: Nov. 24, 2020

(54) TRANSPORT SYSTEM, INFORMATION PROCESSING DEVICE CONFIGURED TO MANAGE INFORMATION ABOUT USER WHO USES AT LEAST ANY ONE OF PLURALITY OF MOBILE UNITS, AND INFORMATION PROCESSING METHOD

(71) Applicant: Toyota Jidosha Kabushiki Kaisha, Toyota-shi Aichi-ken (JP)

(72) Inventors: Yusuke Kaneko, Nagoya (JP); Masato Endo, Nagakute (JP); Shinji Sassa, Ama (JP); Takahiro Shiga, Chiryu (JP); Yohei Tanigawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 16/229,349

(22) Filed: Dec. 21, 2018

(65) Prior Publication Data
US 2019/0196470 A1     Jun. 27, 2019

(30) Foreign Application Priority Data
Dec. 27, 2017   (JP) ................. 2017-252276

(51) Int. Cl.
   *G05D 1/00*        (2006.01)
   *G06F 16/22*      (2019.01)
   (Continued)

(52) U.S. Cl.
CPC ....... *G05D 1/0088* (2013.01); *B60H 1/00742* (2013.01); *B60L 53/65* (2019.02);
(Continued)

(58) Field of Classification Search
CPC .......... G05D 1/0088; G05D 2201/0216; G06F 16/22; G06F 16/24575; G06F 16/252; B60L 53/66; B60H 1/00742; G06Q 10/00
See application file for complete search history.

(56) References Cited

U.S. PATENT DOCUMENTS

2016/0019497 A1   1/2016   Carvajal
2017/0285642 A1   10/2017   Rander
(Continued)

FOREIGN PATENT DOCUMENTS

CA        3023319 A1    11/2017
JP      2002244947 A     8/2002
(Continued)

*Primary Examiner* — Kenneth J Malkowski
(74) *Attorney, Agent, or Firm* — Dinsmore & Shohl LLP

(57) ABSTRACT

A transport system, an information processing device, and an information processing method are disclosed. A transport system includes: a plurality of mobile units; and a server configured to manage information about a user who uses at least any one of the plurality of mobile units, the server including a characteristic database configured to store characteristic information in association with user identification information of the user, the characteristic information including a characteristic that is used when a mobile unit used by the user responds to the user, and a processing unit configured to, execute, based on the characteristic information identified by the user identification information, a first process in response to a first request from the mobile unit used by the user, and transmit a result of the first process to the mobile unit.

9 Claims, 21 Drawing Sheets

(51) Int. Cl.
    *G06F 16/2457*  (2019.01)
    *G06F 16/25*    (2019.01)
    *G06Q 30/02*    (2012.01)
    *B60L 53/66*    (2019.01)
    *B60H 1/00*     (2006.01)
    *G06Q 30/06*    (2012.01)
    *G06Q 10/00*    (2012.01)
    *G06Q 50/30*    (2012.01)
    *B60L 53/65*    (2019.01)
    *H04W 88/02*    (2009.01)
    *G05D 1/02*     (2020.01)

(52) U.S. Cl.
    CPC .............. *B60L 53/66* (2019.02); *G06F 16/22* (2019.01); *G06F 16/24575* (2019.01); *G06F 16/252* (2019.01); *G06Q 10/00* (2013.01); *G06Q 30/0269* (2013.01); *G06Q 30/0645* (2013.01); *G06Q 50/30* (2013.01); *B60L 2250/12* (2013.01); *B60L 2250/14* (2013.01); *B60L 2250/20* (2013.01); *G05D 1/021* (2013.01); *G05D 2201/0212* (2013.01); *H04W 88/02* (2013.01)

(56)            References Cited

U.S. PATENT DOCUMENTS

2017/0352267 A1   12/2017   Tzirkel-Hancock et al.
2019/0118887 A1   4/2019    Kinuhata et al.

FOREIGN PATENT DOCUMENTS

| JP | 2004037292 A   | 2/2004  |
| JP | 2006170619 A   | 6/2006  |
| JP | 2006-206225 A  | 8/2006  |
| JP | 2008097449 A   | 4/2008  |
| JP | 2008293102 A   | 12/2008 |
| JP | 2016-112651 A  | 6/2016  |
| JP | 2016-218736 A  | 12/2016 |
| JP | 2017-126133 A  | 7/2017  |
| KR | 1020150072718 A | 6/2015 |
| KR | 1020160072621 A | 6/2016 |
| WO | 2015077637 A1  | 5/2015  |
| WO | 2017/168465 A1 | 10/2017 |

FIG. 7

PALLET MANAGEMENT TABLE

| PALLET ID | TYPE AND APPLICATION | RETURN DESTINATION ID | RETURN DESTINATION NAME | RETURN DESTINATION ADDRESS | RETURN DESTINATION POINT (LATITUDE AND LONGITUDE) | DOOR TYPE | SIZE | LOAD CAPACITY | PASSENGER CAPACITY | FULL-CHARGE RANGE |
|---|---|---|---|---|---|---|---|---|---|---|
| PIDN1 | ACCOMPANYING SHOPPING | LCM1 | A COMPANY | B CITY C TOWN | X1, Y1 | FOLDING | W, H, D | G1 | 0 | D1 |
| .. | ACCOMPANYING TRAVEL | .. | .. | .. | | SLIDING | .. | .. | 0 | .. |
| .. | PASSENGER USE AND CARRYING USE | .. | .. | .. | | HINGED | .. | .. | 2 | .. |
| .. | .. | .. | .. | .. | | .. | .. | .. | .. | .. |

FIG. 8

RENTAL PALLET MANAGEMENT TABLE

| PALLET ID | USER ID | RENTAL START DATE | SCHEDULED RETURN DATE | RETURN DATE |
|---|---|---|---|---|
| | | | | |

FIG. 9

| USER MANAGEMENT TABLE | | | | | | | | | | | |
|---|---|---|---|---|---|---|---|---|---|---|---|
| USER ID | SEX | BIRTHDAY | ADDRESS | OCCUPATION | HOBBY | FAVORITE TEAM | FAVORITE FOOD | FAVORITE COLOR | FAVORITE TELEVISION PROGRAM | MODEL OF PRIVATELY-OWNED CAR | NEAREST STATION AND DISTANCE | FAMILY MAKE-UP |
| | | | | | | | | | | | | |
| | | | | | | | | | | | | |

FIG. 10

USER HISTORY TABLE

| USER ID | LATEST PURCHASES | FREQUENTLY ACCESSED WEBPAGE | FREQUENTLY ACCESSED REAL SHOP | LATEST HEALTH DATA |
|---------|------------------|-----------------------------|-------------------------------|--------------------|
|         |                  |                             |                               |                    |
|         |                  |                             |                               |                    |

TRANSPORT SYSTEM, INFORMATION PROCESSING DEVICE CONFIGURED TO MANAGE INFORMATION ABOUT USER WHO USES AT LEAST ANY ONE OF PLURALITY OF MOBILE UNITS, AND INFORMATION PROCESSING METHOD

CROSS REFERENCE TO RELATED APPLICATION

This application claims priority to Japanese Patent Application No. 2017-252276 filed on Dec. 27, 2017, incorporated herein by reference in its entirety.

BACKGROUND

1. Technical Field

The disclosure relates to a transport system, an information processing device configured to manage information about a user who uses at least any one of a plurality of mobile units, and an information processing method.

2. Description of Related Art

An automated guided vehicle that carries a container, or the like, has been suggested in related arts. For example, an automated guided vehicle for carrying a container, which autonomously travels along a traveling route provided with a straight line, has been suggested (see, for example, Japanese Unexamined Patent Application Publication No. 2016-218736 (JP 2016-218736 A)). In addition, in recent years, a self-guided vehicle that improves user's convenience has also been suggested. For example, the following technique has also been suggested. An image captured by a camera is compared with a user image related to a user of the vehicle, and the vehicle is moved on the condition that the presence of the user, which is shown by the user image, has been recognized (see, for example, Japanese Unexamined Patent Application Publication No. 2017-126133 (JP 2017-126133 A)). In addition, a technique described in Japanese Unexamined Patent Application Publication No. 2006-206225 (JP 2006-206225 A) has been suggested.

SUMMARY

However, in the above-described related arts, a configuration for moving a vehicle without human intervention, such as moving a vehicle along a traveling route and moving a vehicle on the condition that the presence of a user has been recognized, has been suggested. However, not enough consideration has been made to improve user's convenience with the use of a mobile unit having a characteristic appropriate for user's situation, such as user's purpose, user's consciousness, user's individuality, user's style with which the user is familiar in usual daily life, and user's living environment.

A first aspect of the disclosure provides a transport system. The transport system includes: a plurality of mobile units; and a server configured to manage information about a user who uses at least any one of the plurality of mobile units, the server including a characteristic database configured to store characteristic information in association with user identification information of the user, the characteristic information including a characteristic that is used when a mobile unit used by the user responds to the user, and a processing unit configured to, execute, based on the characteristic information identified by the user identification information, a first process in response to a first request from the mobile unit used by the user, and transmit a result of the first process to the mobile unit.

According to the first aspect, the transport system is able to respond to each user via the mobile unit in accordance with the characteristic that is made for the user.

In the first aspect, the server may further include a usage management unit configured to store the user identification information and mobile unit identification information in association with each other, the user identification information being information that identifies the user, the mobile unit identification information being information that identifies the mobile unit that is used by the user, and an accepting unit configured to accept a request to use any one of the plurality of mobile units. The plurality of mobile units may include a first mobile unit and a second mobile unit. The usage management unit may be configured to, when the accepting unit accepts a change request from the user to change the first mobile unit in use to the second mobile unit, store the mobile unit identification information of the second mobile unit and the user identification information of the user in association with each other. The processing unit may be configured to execute a second process in response to a second request from the second mobile unit, and to transmit a result of the second process to the second mobile unit. According to the above configuration, even when the user changes the mobile unit, the server is able to execute a process for the request based on the characteristic information before the mobile unit is changed, and transmit a result of the process to the user via the changed mobile unit.

In the above configuration, the processing unit may be configured to acquire feedback information about the result transmitted in response to a request including the first request and the second request; and the processing unit may be configured to update the characteristic information based on the feedback information. According to this configuration, with the transport system, it is possible to update the characteristic information while incorporating feedback information about the result transmitted in response to the request.

In the first aspect, the characteristic information may include environmental information related to a living environment of the user. The server may further include an environmental information acquisition unit configured to acquire the environmental information from any one of a terminal of the user and a computer provided in the living environment of the user. According to this configuration, with the transport system, it is possible to respond to the user based on the environmental information related to the living environment of the user.

In the first aspect, the characteristic information may include information that is made based on at least any one of interaction between the user and the mobile unit through an information input unit and information output unit of the mobile unit and interaction between the user and the mobile unit through a terminal of the user. According to this configuration, the transport system is able to make the characteristic information based on any one of interaction between the user and the mobile unit and interaction between the user and the mobile unit via the terminal of the user, and is able to transmit a result of the process, which matches user's taste and characteristic, to the user through the mobile unit.

A second aspect of the disclosure provides an information processing device configured to manage information about a user who uses at least any one of a plurality of mobile units.

The information processing device includes: a characteristic database configured to store characteristic information in association with user identification information of the user, the characteristic information including a characteristic that is used when a mobile unit used by the user responds to the user; and a processing unit configured to, in response to a first request from the mobile unit that is used by the user, execute a first process for the first request based on the characteristic information that is identified by the user identification information, and transmit a result of the first process to the mobile unit.

In the second aspect, the information processing device may further include: a usage management unit configured to store user identification information and mobile unit identification information in association with each other, the user identification information being information that identifies the user, the mobile unit identification information being information that identifies the mobile unit used by the user; and an accepting unit configured to accept a request to use any one of the plurality of mobile units. The plurality of mobile units may include a first mobile unit and a second mobile unit. The usage management unit may be configured to, when the accepting unit accepts a change request from the user to change the first mobile unit in use to the second mobile unit, store the mobile unit identification information of the second mobile unit and the user identification information of the user whose change request is accepted, in association with each other. The processing unit may be configured to, execute a second process in response to a second request from the second mobile unit, and to transmit a result of the second process to the second mobile unit.

In the second aspect, the processing unit may be configured to acquire feedback information about the result transmitted in response to a request including the first request and the second request and the processing unit may be configured to update the characteristic information based on the feedback information.

In the second aspect, the information processing device may further include an environmental information acquisition unit configured to acquire environmental information related to a living environment of the user from any one of a terminal of the user and a computer provided in the living environment of the user. The environmental information may be included in the characteristic information.

In the second aspect, the characteristic information may include information that is made based on at least any one of interaction between the user and the mobile unit through an information input unit and an information output unit of the mobile unit and interaction between the user and the mobile unit through a terminal of the user.

A third aspect of the disclosure provides an information processing method that is executed by an information processing device configured to manage information about a user who uses at least any one of a plurality of mobile units. The information processing method includes: storing characteristic information in association with user identification information of the user, the characteristic information including a characteristic that is used when the mobile unit that is used by the user responds to the user; and executing a first process, based on the characteristic information that is identified by the user identification information, in response to a first request from the mobile unit used by the user, and transmitting a result of the first process to the mobile unit.

According to the aspects of the disclosure, it is possible to improve user's convenience with the use of a mobile unit having a characteristic appropriate for user's situation, such as user's purpose, user's consciousness, user's individuality, user's style with which the user is familiar in usual daily life, and user's living environment.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a view that illustrates the configuration of a pallet management table;

FIG. 8 is a view that illustrates the configuration of a rental pallet management table;

FIG. 9 is a view that illustrates the configuration of a user management table;

FIG. 10 is a view that illustrates the configuration of a user history table;

DETAILED DESCRIPTION OF EMBODIMENTS

Hereinafter, a transport system according to an embodiment and an information processing method that is executed in the transport system will be described with reference to the accompanying drawings.

EV Pallet

In the present embodiment, self-propelled electric vehicles called electric vehicle (EV) pallets provide various functions or services to users in cooperation with a computer system on a network. The EV pallets of the present embodiment (hereinafter, simply referred to as EV pallets) are mobile units that are driven automatically without human intervention, and have various dimensions depending on applications. Various EV pallets are usable. Examples of EV pallets include not only small EV pallets that are usable instead of suitcases but also large EV pallets that are able to carry humans or articles.

Each EV pallet includes an information processing device and a communication device for controlling the EV pallet, providing a user interface with a user who uses the EV pallet, exchanging information with various servers on the network, and the like. Each EV pallet provides a user with functions and services added by various servers on the network in addition to processes executable solely in cooperation with various servers on the network.

A user is allowed to change an EV pallet to be used depending on, for example, intended use of the EV pallet, an application of the EV pallet, loads or persons on board the EV pallet, or the like. In the transport system of the present embodiment, even when a user changes an EV pallet to be used, attribute information and characteristic information are saved in a server on the network. The attribute information indicates user's usage history, user's taste, and others, before a change of the EV pallet. The characteristic information indicates the characteristic of a function or service provided to a user, and the like. In this case, a first server that holds the characteristic information and a second server that provides a function or service to the user in cooperation with the EV pallet may be different servers or may be the same server. In any case, the server on the network provides a function or service to the user via the EV pallet based on the characteristic information held on the network with a similar operability, usage feeling, or atmosphere to that before a change of the EV pallet. Therefore, before and after a change of the EV pallet, it is possible to make a user recognize that a plurality of EV pallets interacts with the user with, so to speak, the same personality.

Configuration

Figure 1:
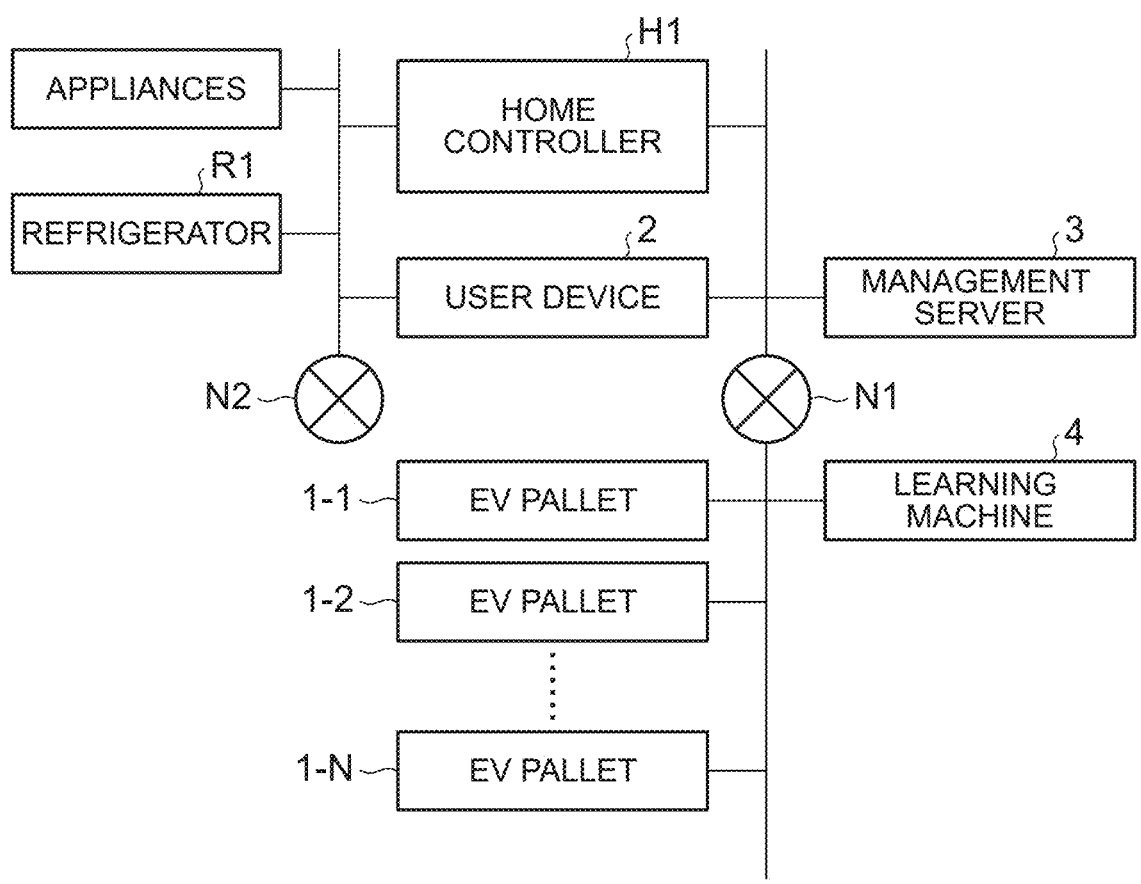
FIG. 1 is a block diagram that illustrates the configuration of a transport system.

FIG. 1 illustrates the configuration of the transport system. The transport system includes a plurality of EV pallets 1-1, 1-2, ..., 1-N, a management server 3, and a learning machine 4. The EV pallets 1-1, 1-2, ..., 1-N are connected to the management server 3 through a network N1. Hereinafter, when the EV pallets 1-1, 1-2, ..., 1-N are not individually distinguished from one another and are collectively referred, the EV pallets 1-1, 1-2, ..., 1-N are simply referred to as EV pallets 1. A user device 2 and a home controller H1 are further connected to the network N1. Furthermore, the user device 2 and the home controller H1 are connected to domestic appliances, such as a refrigerator R1 and other appliances, via a network N2.

The network N1 is a public communication network. For example, the Internet is illustrated as the network N1. The network N1 may include a wired communication network and a wireless communication network. The wireless communication network is, for example, a communication network of each cellular phone company. A wireless local area network (LAN), or the like, may be included in part of the wireless communication network. The wired communication network is a communication network that a communication carrier provides. The wired communication network may include a wired LAN.

The network N2 is, for example, an in-house private network, such as a domestic network and a workplace network. The network N2 may include a wired communication network and a wireless communication network. The network N2 is, for example, an in-house network, such as a wireless LAN and a wired LAN. The network N2 may include a virtual private network (VPN) that is provided in the public communication network.

Each EV pallet 1 is a mobile unit that is able to travel automatically without human intervention and carry a human or an article. Each EV pallet 1 has a user interface under computer control, accepts a request from a user, responds to the user, executes a predetermined process for the request from the user, and informs the user of a result of the process. For example, each EV pallet 1 accepts user's instruction from voice, images, or an input/output device of its computer, and executes a process. Each EV pallet 1 also recognizes a user from user's image, voice, or the like, and follows the user as the user moves. However, for a request that each EV pallet 1 is not able to handle solely among requests from a user, the EV pallet 1 transmits the request from the user to the management server 3, and executes a process in cooperation with the management server 3. Examples of the request that each EV pallet 1 is not able to handle solely include a request to acquire information from a database on the management server 3 and a request to perform recognition or inference with the use of the learning machine 4. The EV pallets 1 may be regarded as examples of a plurality of mobile units.

A user, before using any one of the EV pallets 1, accesses the management server 3 via the user interface of the any one of the EV pallets 1, the user device 2, or the like, and submits a request for registration to use the any one of the EV pallets 1. In response to this request, the management server 3 registers the relation between the user and the pallet that the user uses into a database, and permits the user to use the EV pallet 1. In the present embodiment, the EV pallet 1 that the user is permitted to use and for which the relation between the user and the EV pallet 1 that the user uses is registered in the management server 3 is called my pallet. The user is allowed to change the my pallet to another one of the EV pallets 1 depending on his or her own intended use, or the like. The EV pallets 1 other than the my pallet that the user is allowed to use in this way are called alternative pallets.

Examples of the user device 2 include a cellular phone, a smart phone, a mobile information terminal, a tablet terminal, and a personal computer. The user device 2 accepts a request from the user, responds to the user, executes a predetermined process for the request from the user, and informs the user of a result of the process. The user device 2 accesses, for example, the refrigerator R1 that is one of the domestic appliances, the management server 3 on the network N1, or the like, in cooperation with the EV pallet 1 or in place of the user interface of the EV pallet 1, and provides various processes, functions, or services to the user.

The home controller H1 is an information processing device installed at home. The home controller H1 monitors various appliances connected to the network N2, collects information from these appliances, and controls these appliances. Examples of these appliances include the refrigerator R1, lighting, air conditioning equipment, a bathroom, kitchen facilities, audio video equipment such as a television receiver, the open/closed state of a door provided at a main entrance, or the like. For example, in accordance with an instruction from the user device 2, the home controller H1 records the images and carry-in dates and times of foodstuffs that are carried into the refrigerator R1 with a camera provided in the refrigerator R1. The home controller H1 informs the management server 3 of the images and carry-in dates and times of the foodstuffs carried into the refrigerator R1. Instead of the home controller H1, the user device 2 may acquire the images and carry-in dates and times of foodstuffs that are carried into the refrigerator R1. The home controller H1 is an example of a computer provided in a living environment of the user.

The refrigerator R1 includes the camera and a communication device. The refrigerator R1 is connected to the home controller H1 or the user device 2 via the network N2. An internal control computer of the refrigerator R1, for example, takes an opportunity to open or close a door to acquire images from the camera and determine whether there are foodstuffs in the images. The internal control computer of the refrigerator R1 informs the home controller H1 of images containing foodstuffs, and captured dates and times.

The management server 3 provides various processes, functions, or services to the user in cooperation with the EV pallet 1 registered as my pallet. The management server 3 also improves services that are provided to the user in cooperation with the user device 2, the home controller H1, or the like. For example, the management server 3 collects and estimates user's attribute information including user's personality characteristic, user's physical characteristic, user's health condition, user's taste, users current situation, and the like, and provides a process, function, or service appropriate for the user's attribute information. For this reason, the management server 3 accumulates attribute information, which is obtained from the EV pallet 1, the user device 2, the home controller H1, or the like, in a database, and incorporates the attribute information into a process, function, or service to be provided next. The management server 3 may be regarded as an example of a server that manages information about a user who uses any one of a plurality of mobile units.

For example, when the user inquires of the EV pallet 1 the situation of the refrigerator R1 of the user while the EV pallet 1 is following the user who is shopping, the EV pallet 1 inquires of the management server 3 the situation of the refrigerator R1 of the user. The management server 3 acquires information stored in its own database or acquires information about foodstuffs stored in the refrigerator R1 from the home controller H1, and transmits the information to the EV pallet 1. As a result, the EV pallet 1 is able to provide the user with the information about the foodstuffs stored in the refrigerator R1.

For example, when the EV pallet 1 receives a consultation on today's dinner menu from the user who is shopping, the EV pallet 1 transfers the details of the received consultation to the management server 3. The management server 3 suggests a menu that suits user's taste based on foodstuffs currently stored in the refrigerator R1, user's taste, a record of user's dinner in a predetermined period (for example, approximately several days to a week up to the present time), a history of suggested menus, and the like, in cooperation with the learning machine 4. The management server 3 picks up food materials currently not stored in the refrigerator R1 from among food materials that are used in the suggested menu, and transmits the picked-up food materials to the EV pallet 1 in list form. After that, the EV pallet 1 replies to the consultation from the user in accordance with the food materials transmitted from the management server 3.

The learning machine 4 executes an inference process, a recognition process, or the like, in response to a request from the management server 3. The learning machine 4 may be circuitry including a CPU and a memory, and configured to communicate with the management server 3 through the network N1. The learning machine 4 may be realized by the circuitry of the management server 3 including the CPU 31, the memory 32, and the external storage device 34. For example, the learning machine 4 has multilayer neural networks, and is an information processing device that performs deep learning. That is, the learning machine 4 executes a convolution process, an activation function, and a pooling process. In the convolution process, a parameter string $\{x_i; i=1, 2, \ldots, N\}$ is input, and product-sum operation is performed on the input parameter string with weighting factors $\{w_{i,j,l},$ (here, j is a value from one to the number of elements M up to which convolution operation is performed, l is a value from one to the number of layers L)$\}$. The activation function is used to determine the result of the convolution process. The pooling process is a process of omitting part of the determined result of the activation function on the convolution process. The learning machine 4 repeatedly executes the above-described processes over the multiple layers L, and outputs output parameters (or output parameter string $(y_k; k=1, \ldots, P))$ in a fully connected layer in the final stage. In this case, the input parameter string $\{x_i\}$ is, for example, a pixel string that is one frame of image, a data string that indicates a voice signal, a word string included in natural language, or the like. The output parameters (or output parameter string) $\{y_k\}$ are, for example, characterized portions of the image that is the input parameters, defects in the image, classified result of the image, characterized portions in voice data, a classification result of voice, an estimated result that is obtained from the word string, or the like.

In supervised learning, the learning machine 4 receives a large number of combinations of an existing input parameter string and a proper output value (teaching data) and executes a learning process. In unsupervised learning, the learning machine 4 executes, for example, a process of clustering or abstracting an input parameter string. In the learning process, the factors $\{w_{i,j,l}\}$ of each layer are adjusted such that values obtained as a result of executing the convolution process (and output through the activation function) and the pooling process in each layer and the process in the fully connected layer over the existing input parameter string approach proper output values. Adjustment of the factors $\{w_{i,j,l}\}$ in each layer is performed by causing an error based on a difference between the output in the fully connected layer and the proper output value to propagate from an upper-level layer toward a lower-level input layer. Then, when an unknown input parameter string $\{x_i\}$ is input in a state where the factors $\{w_{i,j,l}\}$ in each layer have been adjusted, the learning machine 4 outputs a recognized result, a determined result, a classification result, an inferred result, or the like, on the unknown input parameter string $\{x_i\}$.

For example, the learning machine 4 extracts user's face portion from an image frame that the EV pallet 1 acquires. The learning machine 4 recognizes user's voice and accepts an instruction by voice from voice data that the EV pallet 1 acquires. The learning machine 4 suggests today's dinner menu based on the types of foodstuffs currently stored in the refrigerator R1, user's taste, and actual menus suggested to the user in the past. In the present embodiment, the learning machine 4 is not limited to performing machine learning through deep learning. The learning machine 4 may perform general learning by perception, learning with another neural network, a search and statistical process using genetic algorithm, or the like.

Figure 2:
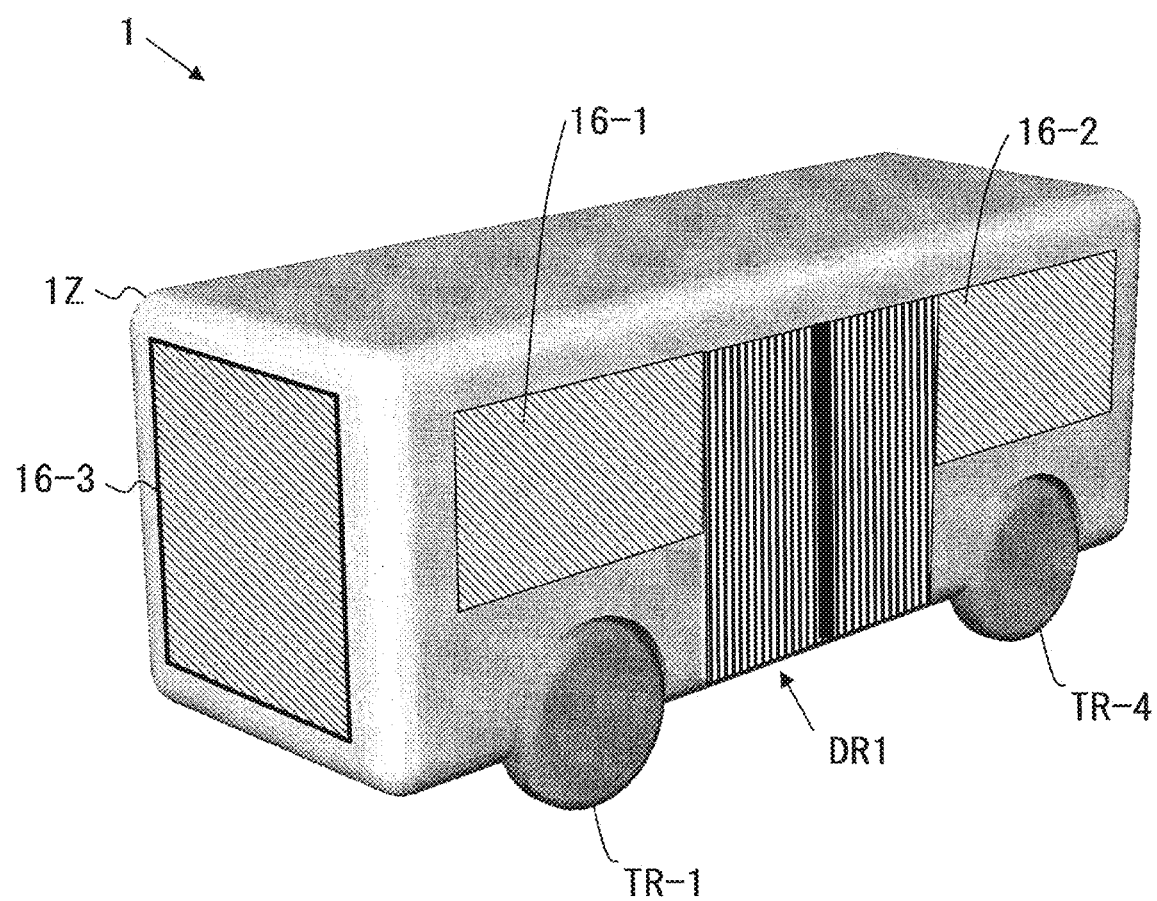
FIG. 2 is a perspective view that illustrates the appearance of an EV pallet.
Figure 3:
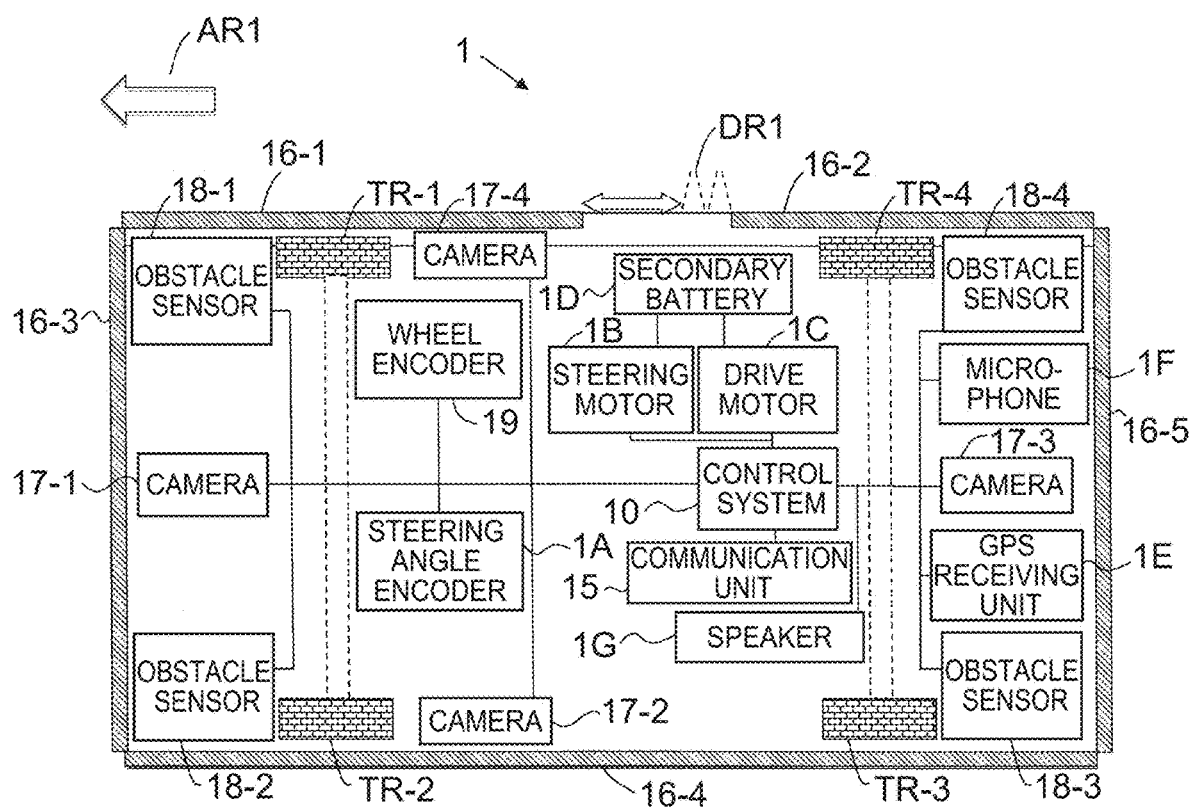
FIG. 3 is a plan view when arrangement of sensors, displays, drive unit, and control system, mounted on the EV pallet, when viewed from the bottom of the EV pallet.
Figure 4:
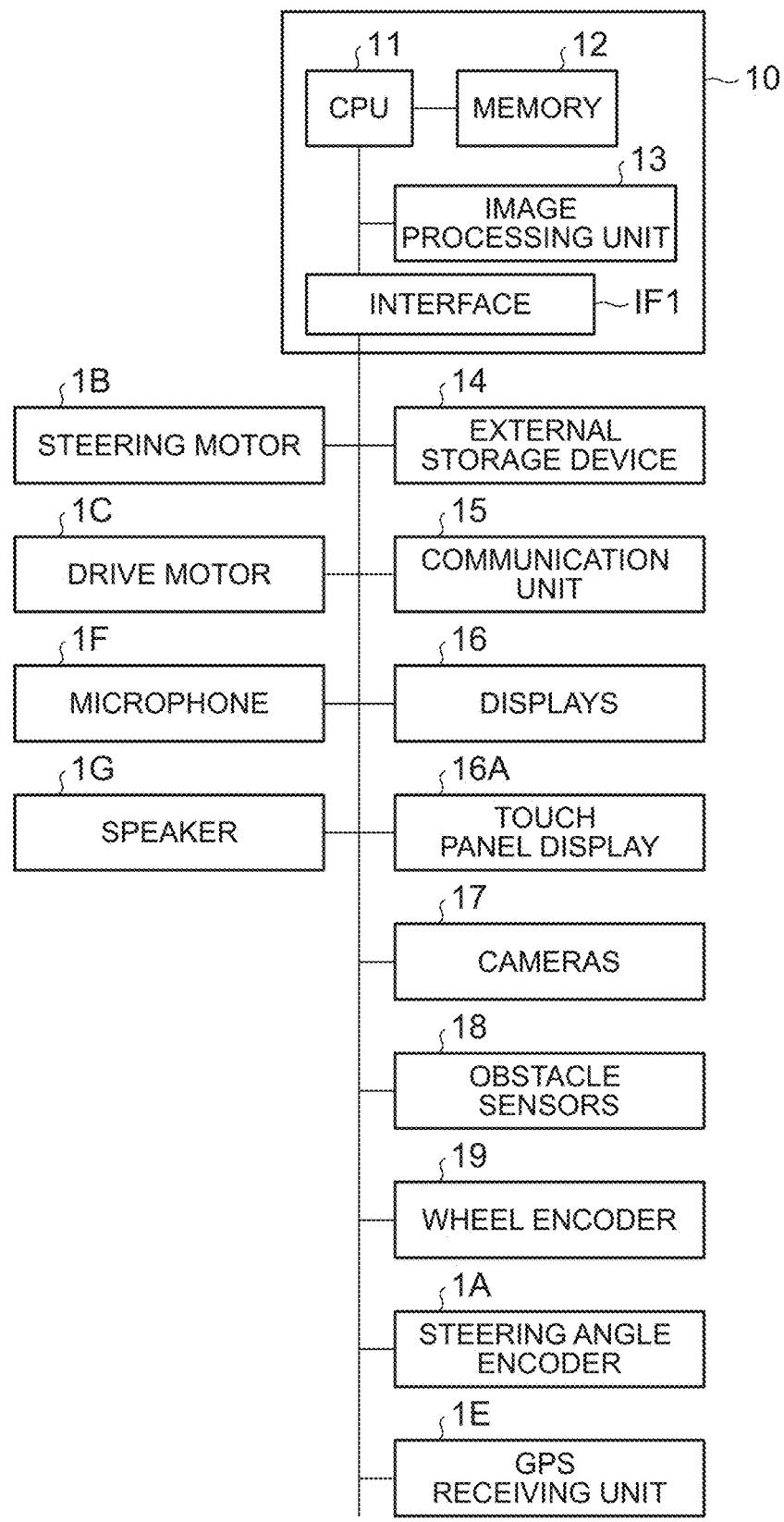
FIG. 4 is a block diagram that illustrates the configuration of the control system and components associated with the control system.

FIG. 2 is a perspective view that illustrates the appearance of each EV pallet 1. FIG. 3 is a plan view that illustrates arrangement of sensors, displays, drive unit, and control system, mounted on the EV pallet 1, when viewed from the bottom of the EV pallet 1. FIG. 4 is a block diagram that illustrates the configuration of the control system 10 and components associated with the control system 10.

The EV pallet 1 includes a box-shaped body 17, and four wheels TR1, TR2, TR3, TR4. The four wheels TR1, TR2, TR3, TR4 are provided at the front and rear sides in a traveling direction on both sides at the lower portion of the body 1Z. The four wheels TR1, TR2, TR3, TR4 are coupled to drive shafts (not shown), and are driven by a drive motor 1C illustrated in FIG. 3. The traveling direction of the four wheels TR1, TR2, TR3, TR4 while the EV pallet 1 is traveling (a direction parallel to the plane of rotation of each of the four wheels TR1, TR2, TR3, TR4) undergoes displacement relative to the body 1Z by a steering motor IS illustrated in FIG. 3. Thus, the traveling direction is controlled.

As shown in FIG. 2 and FIG. 3, displays 16-1, 16-2, 16-3, 16-4, 16-5 are fixed to the outer wall of the body 1Z of the EV pallet 1. Examples of each of the displays 16-1, 16-2, 16-3, 16-4, 16-5 include a liquid crystal display, and an electroluminescence panel. When the displays 16-1, 16-2, 16-3, 16-4, 16-5 are not individually distinguished from one another and are collectively referred, the displays 16-1, 16-2, 16-3, 16-4, 16-5 are referred to as displays 16.

In FIG. 3, it is assumed that the EV pallet 1 is traveling in an arrow AR1 direction. Therefore, it is assumed that the leftward direction in FIG. 3 is the traveling direction. In FIG. 3, the face of the body 1Z on the preceding side in the traveling direction is referred to as the front face of the EV pallet 1, and the face on the other side in the traveling direction is referred to as the rear face of the EV pallet 1. The face of the body 1Z on the right side with respect to the traveling direction is referred to as right side face, and the face of the body 1Z on the left side with respect to the traveling direction is referred to as left side face.

As shown in FIG. 3, the EV pallet 1 includes obstacle sensors 18-1, 18-2, 18-3, 18-4. The obstacle sensors 18-1, 18-2 are respectively provided at locations close to corners at both sides of the front face. The obstacle sensors 18-3, 18-4 are provided at locations close to corners at both sides of the rear face. The EV pallet 1 includes cameras 17-1, 17-2, 17-3, 17-4. The cameras 17-1, 17-2, 17-3, 17-4 are respectively provided at the front face, the left side face, the rear face, and the right side face. When the obstacle sensors 18-1, 18-2, 18-3, 18-4 are not individually distinguished from one another and are collectively referred, the obstacle sensors 18-1, 18-2, 18-3, 18-4 are referred to as obstacle sensors 18 in the present embodiment. When the cameras 17-1, 17-2, 17-3, 17-4 are not individually distinguished from one another and are collectively referred, the cameras 17-1, 17-2, 17-3, 17-4 are referred to as cameras 17 in the present embodiment.

The EV pallet 1 includes the steering motor 1B, the drive motor 1C, and a secondary battery 1D. The secondary battery 1D supplies electric power to the steering motor 1B and the drive motor 1C. The EV pallet 1 includes a wheel encoder 19 and a steering angle encoder 1A. The wheel encoder 19 detects the rotation angle of each wheel from moment to moment. The steering angle encoder 1A detects a steering angle that is a running direction of each wheel. The EV pallet 1 further includes the control system 10, a communication unit 15, a global positioning system (GPS) receiving unit 1E, a microphone 1F, and a speaker 1G. Although not shown in the drawing, the secondary battery 1D also supplies electric power to the control system 10, and the like. However, a power supply that supplies electric power to the control system 10, and the like, may be provided in addition to the secondary battery 1D that supplies electric power to the steering motor 1B and the drive motor 1C.

The control system 10 is also called an electronic control unit (ECU). As shown in FIG. 4, the control system 10 includes a CPU 11, a memory 12, an image processing unit 13, and an interface IF1. An external storage device 14, the communication unit 15, the displays 16, a touch panel display 16A, the cameras 17, the obstacle sensors 18, the wheel encoder 19, the steering angle encoder 1A, the steering motor 1B, the drive motor 1C, the GPS receiving unit 1E, the microphone 1F, the speaker 1G, and the like, are connected to the interface IF1.

Each obstacle sensor 18 is an ultrasonic sensor, radar, or the like. Each obstacle sensor 18 emits ultrasonic waves, electromagnetic waves, or the like, toward a detecting object direction, and detects the presence, location, relative velocity, and the like, of an obstacle in the detecting object direction based on reflected waves.

Each camera 17 is a photographing device with an image sensor, such as a charge coupled device (CCD), a metal oxide semiconductor (MOS), and a complementary metal oxide semiconductor (CMOS). Each camera 17 acquires an image at predetermined time intervals, and stores the acquired image in a frame buffer (not shown) in the control system 10. The predetermined time interval is called frame period. An image that is stored in the frame buffer at intervals of the frame period is called frame data.

The steering motor 1B controls the direction of a line of intersection at which the plane of rotation of each wheel and a horizontal plane intersect with each other, that is, an angle that becomes the traveling direction resulting from the rotation of each wheel, in accordance with an instruction signal from the control system 10. The drive motor 1C, for example, drives and rotates the wheels TR1, TR2, TR3, TR4 in accordance with an instruction signal from the control system 10. Alternatively, the drive motor 1C may drive the pair of wheels TR1, TR2 or the other pair of wheels TR3, TR4 among the wheels TR1, TR2, TR3, TR4. The secondary battery 1D supplies electric power to components that are connected to the steering motor 1B, the drive motor 1C, and the control system 10.

The steering angle encoder 1A detects the direction of a line of intersection at which the plane of rotation of each wheel and the horizontal plane intersect with each other (or the angle of the rotation axis of each wheel in the horizontal plane), which is the traveling direction resulting from rotation of the wheel, at predetermined detecting time intervals, and stores the detected direction in a register (not shown) of the control system 10. For example, the origin of the angle is set to a direction in which the rotation axis of each wheel is orthogonal to the traveling direction (arrow AR1 direction) in FIG. 3. The wheel encoder 19 acquires the rotation speed of each wheel at predetermined detection time intervals, and stores the acquired rotation speed in the register (not shown) of the control system 10.

The communication unit 15 carries out communication with various servers, and the like, on the network N1 through, for example, a cellular phone base station and a public communication network connected to the cellular phone base station. The GPS receiving unit 1E receives radio waves of time signals from a plurality of satellites (global positioning satellites) that orbit around the earth, and stores the time signals in the register (not shown) of the control system 10. The microphone 1F detects voice, converts the voice into a digital signal, and stores the digital signal in the register (not shown) of the control system 10.

The speaker 1G is driven by a D/A converter and an amplifier that are connected to the control system 10 or a signal processing unit (not shown), and reproduces audio including sound and voice.

The CPU 11 of the control system 10 executes a computer program developed on the memory 12 in an executable manner, and executes a process as the control system 10. The memory 12 stores computer programs that the CPU 11 executes, data that the CPU 11 processes, and the like. Examples of the memory 12 include a dynamic random access memory (DRAM), a static random access memory (SRAM), and a read only memory (ROM). The image processing unit 13 processes data in the frame buffer, which is obtained from the cameras 17 at predetermined intervals of the frame period, in cooperation with the CPU 11. The image processing unit 13 includes, for example, a GPU and an image memory that serves as the frame buffer. The external storage device 34 is a nonvolatile storage device. Examples of the external storage device 34 include a solid state drive (SSD), and a hard disk drive.

For example, as shown in FIG. 4, the control system 10 acquires detected signals from the sensors at various portions of the EV pallet 1 via the interface IF1. The control system 10 also calculates a latitude and a longitude that indicate a location on the earth based on detected signals from the GPS receiving unit 1E. Furthermore, the control system 10 acquires map data from a map information database 307 stored in the external storage device 14, compares the calculated latitude and longitude with the location on the map data, and determines a current location. The control system 10 also acquires a route that starts from the current location to a destination on the map data. The control system 10 detects an obstacle around the EV pallet 1 based on signals from the obstacle sensors 18, the cameras 17, and the like, determines the traveling direction such that the EV pallet 1 avoids the obstacle, and controls the steering angle.

Furthermore, the control system 10 processes images that are acquired from the cameras 17 for each frame data in cooperation with the image processing unit 13, detects a change based on, for example, a difference in image, and recognizes an obstacle. The control system 10 recognizes the user with each of pieces of frame data of the images from each camera 17, keeps a distance to the user at a predetermined value, and follows the movement of the user. The control system 10 recognizes user's gesture in frame data of images from the cameras 17, and responds to user's intention that is obtained from the recognized gesture. The control system 10 analyzes a voice signal that is obtained from the microphone 1F, and responds to user's intention obtained through voice recognition. The control system 10 may transmit frame data of images from the cameras 17 and voice data that is obtained from the microphone 1F, to the management server 3 on the network N1 via the communication unit 15. Analyzing frame data of images and voice data may be assigned to the management server 3.

The control system 10 displays an image, text, and other information on the displays 16. The control system 10 detects an operation to the touch panel display 16A, and accepts an instruction from the user. The control system 10 responds to the instruction from the user via the touch panel display 16A, the cameras 17, or the microphone 1F with the use of the displays 16, the touch panel display 16A, or the speaker 1G.

In FIG. 4, the interface IF1 is illustrated; however, a device that performs an exchange of signals between the control system 10 and controlled objects is not limited to the interface IF1. That is, the control system 10 may have a plurality of signal exchange paths other than the interface IF1. In FIG. 4, the control system 10 includes the single CPU 11. However, the CPU 11 is not limited to a single processor. The CPU 11 may have a multiprocessor configuration. A single CPU that is connected with a single socket may have a multicore configuration. At least part of processes of the above-described components may be executed by a processor other than the CPU 11, that is, for example, a special purpose processor, such as a digital signal processor (DSP) and a graphics processing unit (GPU). At least part of processes of the above-described components may be an integrated circuit (IC) or another digital circuit. An analog circuit may be included in at least part of the above-described components.

Figure 5:
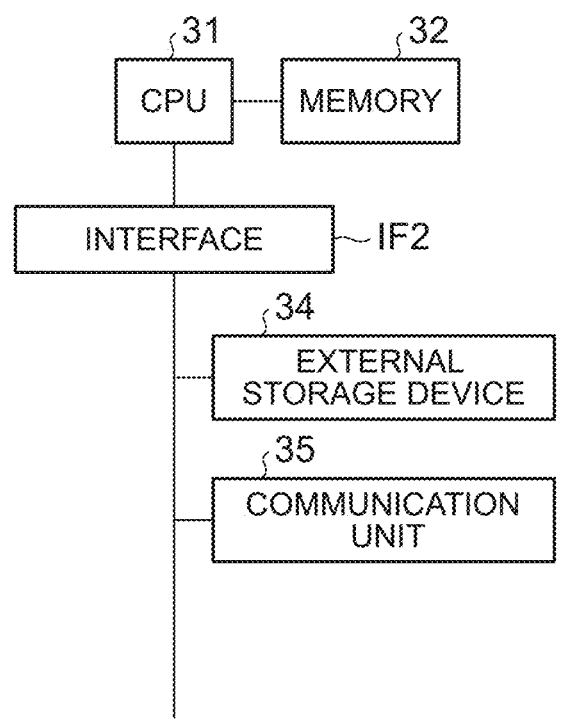
FIG. 5 is a block diagram that illustrates the hardware configuration of a management server.

FIG. 5 is a block diagram that illustrates the hardware configuration of the management server 3. The management server 3 includes a CPU 31, a memory 32, an interface IF2, an external storage device 34, and a communication unit 35. The configurations and operations of the CPU 31, memory 32, interface IF2, external storage device 34, and communication unit 35 are similar to those of the CPU 11, memory 12, interface IF1, external storage device 14, and communication unit 15 of FIG. 4. The configuration of the user device 2 is also similar to the configuration of the management server 3 of FIG. 5. The user device 2 may have, for example, a touch panel as an input unit for accepting user's operation. The user device 2 may have a display and a speaker as an output unit for providing information to the user.

Figure 6:
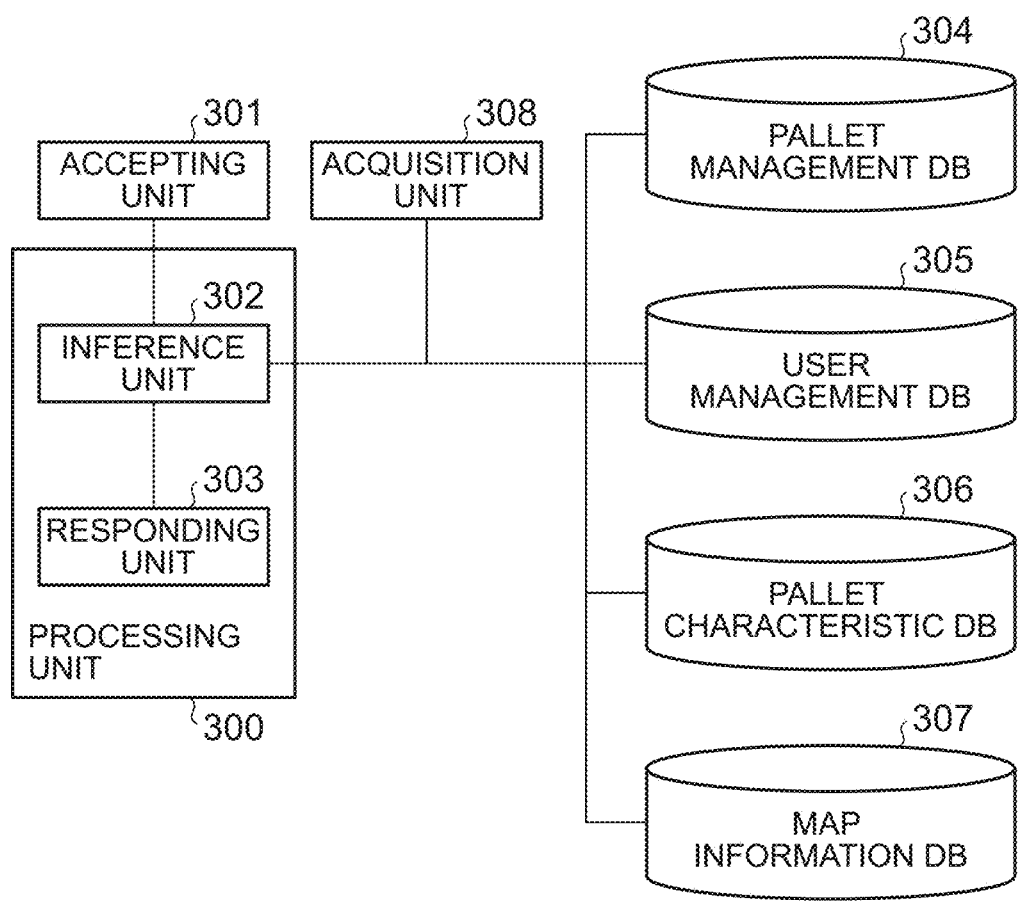
FIG. 6 is a block diagram that illustrates the logical configuration of the management server.

FIG. 6 is a block diagram that illustrates the logical configuration of the management server 3. The management server 3 operates as components illustrated in FIG. 6 by executing computer programs on the memory 32. That is, the management server 3 includes an accepting unit 301, an inference unit 302, a responding unit 303, an acquisition unit 308, a pallet management database 304, a user management database 305, a pallet characteristic database 306, and a map information database 307. In FIG. 6, the databases are abbreviated as DBs.

The accepting unit 301 accepts a request from each EV pallet 1 through the communication unit 35. A request from the EV pallet 1 is a request for a process that the EV pallet 1 is difficult to execute alone. Examples of the request for a process that the eV pallet 1 is difficult to execute alone include a request for a process that is executed by consulting the pallet management database 304, the user management database 305, or the pallet characteristic database 306, and a request for a process that is executed in cooperation with the learning machine 4. The accepting unit 301 also accepts a request for a process of registering any one of the EV pallets 1 as my pallet from the any one of the EV pallets 1 or the user device 2.

The inference unit 302, for example, searches the pallet management database 304, the user management database 305, or the pallet characteristic database 306 for data, and executes a process that is executed in cooperation with the learning machine 4. In addition, the inference unit 302 executes a process in response to a request from the EV pallet 1, receives feedback information from the EV pallet 1 after completion of the process, transmits the received feedback information to the learning machine 4, and causes the learning machine 4 to perform further learning. That is, the inference unit 302 executes, for example, deep learning over an input parameter string on which the learning machine 4 has executed a recognition process with the use of the feedback information as teaching data.

The responding unit 303 transmits, to the EV pallet 1, a result of searching the pallet management database 304, the user management database 305, or the pallet characteristic database 306 for data by the inference unit 302, or a result of inference or a result of recognition process by the learning machine 4. The inference unit 302 and the responding unit 303 are collectively referred to as processing unit 300.

The acquisition unit 308 acquires information related to user's living environment from the EV pallet 1, the user device 2, the home controller H1, or the like. Examples of the information related to user's living environment include a list of purchases in shopping, information about foodstuffs carried into the refrigerator R1, information about purchases purchased through a shopping site on the Internet, and information about programs watched on a television receiver. The acquisition unit 308 may be regarded as an example of an environmental information acquisition unit.

The pallet management database 304 is a database that manages the attributes of each of the EV pallets 1 that are managed by the transport system of the present embodiment. Examples of the attributes include a characteristic, such as type or application, physical parameters, such as dimensions, and management information, such as return destination. The user management database 305 is a database that manages the attributes of each of users who use the transport system of the present embodiment. Examples of the attributes include personal information, such as address, sex, and age, and information related to taste and living environment. The pallet characteristic database 306 is a database that manages the characteristics of the EV pallets 1 that the users use as my pallets user by user. The characteristic of each EV pallet 1 may be, for example, a weighting factor string for convolution operation, which is obtained through deep learning that the learning machine 4 performs. Information of the pallet characteristic database 306 is stored in association with a user ID. The pallet characteristic database 306 may be regarded as an example of a characteristic database.

The map information database 307 is a database in which map information of all over the country or all over the world is stored. Other than the map information database 307 provided in the external storage device 14 of the management server 3, the map information database 307 may be provided in another system that is connected to the network N1. For example, the map information database 307 may be provided in a geographic information system (GIS). The map information database 307 contains map data including planimetric feature locations, and data of text, photos, and the like, that represent the characteristics of points on the map data.

Examples of Data

FIG. 7 illustrates the configuration of a pallet management table in the pallet management database 304. The pallet management table holds the type, application, physical parameters, and other characteristics of each of the EV pallets 1 that belong to the transport system of the present embodiment. In FIG. 7, each row in the table corresponds to one EV pallet 1. The pallet management table has fields of pallet ID, type or application, return destination ID, return destination name, return destination address, door type, size, load capacity, passenger capacity, and full-charge range.

A pallet ID is identification information for uniquely identifying each EV pallet 1 in the transport system of the present embodiment. The type or application is information that identifies the type or application of each EV pallet 1. Examples of the type or application include "accompanied shopping", "accompanied travel", "passenger use", and "carrying use". In FIG. 7, the type or application is illustrated as a character string. Instead, the type or application may be specified as a code, a number, or the like.

The return destination 1D is identification information that identifies a return destination after usage of the EV pallet 1 has ended. The return destination name is the company name of a return destination, the name of an owner of the EV pallet 1, or the like. The return destination address is the address of a return destination. The return destination point is information that identifies a return destination by latitude and longitude. The door type is how a door opens or closes. Examples of the door type include "folding", "sliding", and "hinged". In FIG. 7, the door type is illustrated as character strings; however, the door type may be specified by code, number, or the like.

The size is the dimensions, capacity, or the like, of the EV pallet 1. The size is specified by, for example, width (W), height (H), and depth (D). However, the size may be specified by, for example, the capacity (for example, cubic meter, or the like) of the EV pallet 1. The load capacity is a weight up to which the EV pallet 1 is allowed to be loaded. The passenger capacity is the number of persons who can ride on the EV pallet 1. The full-charge range is a range to which the EV pallet 1 is able to travel when the secondary battery 1D is fully charged.

FIG. 8 illustrates the configuration of a rental pallet management table in the pallet management database 304. The rental pallet management table is a table that records the relation between any one of the EV pallets 1 and a user who rents the EV pallet 1. In the table of FIG. 8, one row corresponds to a record of rental of a pallet. The rental pallet management table has fields of pallet ID, user ID, rent start date, scheduled return date, and return date.

The pallet ID of the rental pallet management table is identification information for identifying the EV pallet 1 intended for rental management, and is the same information as the pallet ID that is defined in the pallet management table. The user ID is identification information for identifying the user who rents (rented) the EV pallet 1, and is the same information as the user ID that will be described with reference to FIG. 9. The rent start date is a start date on which the EV pallet 1 identified by the pallet ID is rented to the user identified by the user ID. The scheduled return date is a scheduled return date for which the user applies at the time of renting the EV pallet 1. The scheduled return date may be not determined. The return date is a date on which the EV pallet 1 identified by the pallet ID is returned by the user identified by the user ID. The rental pallet management table of the pallet management database 304 stores the user ID of a user who uses any one of the EV pallets 1 and the pallet ID of the EV pallet 1 to be used in association with each other, so the rental pallet management table may be regarded as an example of a usage management unit.

FIG. 9 illustrates the configuration of a user management table in the user management database 305. The user management table manages user's attribute information. The user's attribute information is information regarding user's individuality, and includes, for example, fixed information, such as sex and birthday, and variable information regarding occupation, hobby, and taste. Each row of the table of FIG. 9 is a record for one user. The user management table contains user ID, sex, birthday, address, occupation, hobby, favorite team, favorite food, favorite color, favorite television program, the model of a privately-owned car, the nearest station and distance, family make-up, and the like.

The user ID is identification information for identifying a user who uses any one of the EV pallets 1. The user ID is unique identification information in the transport system of the present embodiment, and is the same information as the user ID of the rental pallet management table (FIG. 8). The sex, address, birthday, and occupation are respectively user's sex, home address at which the user lives, user's birthday, and user's occupation. The hobby is user's hobby, and is set with a character string like "shopping", "travel", or the like. However, the hobby may be specified with code or number.

The favorite team is a baseball team, a soccer team, or the like, that the user supports, and is set with a character string. The favorite food is a food that the user likes, and is set with a character string or code. The favorite color is a color that the user likes, and is set with a character string or code. The favorite television program is a television program that the user likes to watch. The favorite team, the favorite food, the favorite color, and the favorite television program may be set in the user management table in response to user's application. The management server 3 may acquire the favorite team, the favorite food, the favorite color, and the favorite television program from, for example, user's activity history that is obtained from the EV pallet 1, the user device 2, the home controller H1, or the like, for example, a watching history of television programs, a product purchase history in internet shopping.

The learning machine 4 may estimate or recognize user's favorite team, favorite food, favorite color, and favorite television program through inference based on data that is provided from the EV pallet 1, the user device 2, the home controller H1, or the like. The management server 3 may cause the learning machine 4 to execute a process of estimating or recognizing user's favorite team, favorite food, favorite color, and favorite television program with, for example, provision of data from the EV pallet 1, the user device 2, the home controller H1, or the like, as a trigger. The management server 3 may cause the learning machine 4 to execute a process of estimating or recognizing user's favorite team, favorite food, favorite color, and favorite television program at the timing at which the EV pallet 1 has been rented to the user or the timing at which the EV pallet 1 has been returned from the user. The management server 3 may periodically cause the learning machine 4 to execute a process of estimating or recognizing user's favorite team, favorite food, favorite color, and favorite television program.

The model of the privately-owned car is a list of models of automobiles that the user owns. When the user owns no automobile, NULL is set. The nearest station and distance are respectively the nearest station from user's home and a distance from home to the nearest station. The family make-up is the make-up of a family with which the user lives at home. The family make-up is a list of user IDs included in a family. The family make-up may be, for example, a pointer to the intended record of a family table (not shown). User IDs of each family are specified in the family table. For example, wife: UD11, first born son: UD12, and the like, are set. The user management table in the user management database 305 stores various pieces of information in association with a user ID. The user ID is an example of user identification information. The user management table is consulted when the management server 3 executes a process for a request from any one of the EV pallets 1. The EV pallet 1 acquires a result of the process that is executed by the management server 3, and responds to the user in accordance with the acquired result of the process. That is, the EV pallet 1 may be regarded as responding to the user in accordance with the attribute information of the user management table through the process that is executed by the management server 3. Therefore, the user management table in the user management database 305 may be regarded as an example of a characteristic database that stores characteristic information, including a characteristic that is used when a mobile unit that is used by a user responds to the user, in association with user identification information.

FIG. 10 illustrates the configuration of a user history table in the user management database 305. The user history table records a history based on activity that a user has performed via the EV pallet 1 or the user device 2. The user history table has fields of user ID, latest purchases, frequently accessed pages, frequently accessed real shops, and latest health data. The configuration of FIG. 10 is illustrative. The configuration of the user history table is not limited to the configuration of FIG. 10.

The user ID is identification information for identifying a user who uses any one of the EV pallets 1, and is the same information as that of the user management table (FIG. 9). The latest purchases are the names of purchases that the user purchased. The latest purchases are, for example, obtained by recording information that is provided to the management server 3 each time the EV pallet 1 checks out at a purchase shop. The latest purchases are, for example, prepared as a list of purchases in a predetermined period (for example, the latest one year, the latest four months, the latest one month, the latest one week, or the like). The latest purchases may be a list of purchases in predetermined number in reverse chronological order of purchase date.

The frequently accessed webpages are a list of webpages that the user has frequently accessed via the user device 2, the home controller H1, or the like. The frequently accessed webpages are, for example, a list of webpages (URLs) with a large number of accesses among webpages accessed in a predetermined period (for example, the latest one year, the latest four months, the latest one month, the latest one week, or the like).

The frequently accessed rear shops are a list of shops that the user has visited together with the EV pallet 1. The EV pallet 1 follows the user and recognizes a visit to a shop based on information of latitude and longitude obtained with GPS and information of the map information database 307, stored in the external storage device 14, or information that indicates a payee at the time of a checkout at a shop, or the like, and informs the management server 3 of information that identifies the recognized shop. The management server 3 generates a list of shops to which the number of visits is large among shops visited in a predetermined period (for example, the latest one year, the latest four months, the latest one month, the latest one week, or the like), and updates information about the frequently accessed real shops.

The latest health data is, for example, information related to the least health measured by the user. Examples of the information include height, weight, pulse, blood pressure, breathing rate, body temperature, average steps per day, and the path name of a storage location at which the latest medical examination data is stored. For the height, weight, pulse, blood pressure, breathing rate, body temperature, and the like, for example, as domestic measurement devices have measured these pieces of data as a trigger, the home controller H1 should collect the measured data from the measurement devices, and should inform the management server 3 of the collected measured data. The latest medical examination data is, for example, the result of medical examination, which sent from a medical examination institution and stored in a file at a predetermined path in, for example, the user device 2, the home controller H1, or the like. The user history table in the user management database 305 stores information of histories of health data in association with the user ID. The user history table is consulted when the management server 3 executes a process in response to a request from the EV pallet 1 and transmits a result of the process to the EV pallet 1. The EV pallet 1 responds to the user in accordance with the result of the process transmitted from the management server 3. That is, the EV pallet 1 may be regarded as responding to the user in accordance with the attribute information of the user history table through the process that is executed by the management server 3. Therefore, the user history table in the user management database 305 may be regarded as an example of the characteristic database. The user history table may be regarded as an example of environmental information related to a living environment of a user.

A refrigerator list in the user management database 305 is, for example, as follows,
Refrigerator list={(Item name=Milk, Purchase date=YYMMDD, Volume=GGG, Best-before date=YYMMDD),
(Item name=Cabbage, Purchase date=YYMMDD, Volume=½, Best-before date=NULL),
. . . }

The refrigerator list is information that identifies foodstuffs, and the like, stored in the refrigerator, and is, for example, data in a list of sets of (item name, purchase date, volume, and best-before date). However, the above-described refrigerator list is an example of a refrigerator list, and the refrigerator list is not limited to a set of (item name, purchase date, volume, and best-before date). When the EV pallet 1 checks out purchases at a shop that the user has visited together with the EV pallet 1, the EV pallet 1 informs the management server 3 of the checked-out purchases. For example, each time the user carries a foodstuff into the refrigerator R1, the camera provided in the refrigerator R1 informs the management server 3 of an image of the carry-in foodstuff via the network N2, the home controller H1, and the network N1. For example, each time the user carries out a foodstuff from the refrigerator R1, the camera provided in the refrigerator R1 informs the management server 3 of an image of the carry-out foodstuff. The management server 3 identifies the name, purchase date, volume, and best-before date of a purchased foodstuff in accordance with the information from the EV pallet 1 and the information from the camera of the refrigerator R1, and updates the refrigerator list. For a foodstuff that is packed with a package and of which the volume cannot be determined from the appearance, the management server 3 may, for example, estimate the volume from an interval between purchase dates based on a purchase history of the foodstuff. The volume may not be an absolute value, and may be, for example, information, such as 1/N of the volume at the time of purchasing. When the best-before date is not identified, the management server 3 should set the best-before date of the purchase to NULL.

When a foodstuff that the user purchased is carried into the refrigerator R1, the refrigerator R1 may read a receipt of the purchased foodstuff. As the refrigerator R1 reads a receipt as a trigger, the refrigerator R1 should inform the management server 3 of a purchased product that is carried into the refrigerator R1 via the network N2, the home controller H1, and the network N1. The refrigerator list may be regarded as an example of environmental information related to a living environment of a user.

Example of Page

Figure 11:
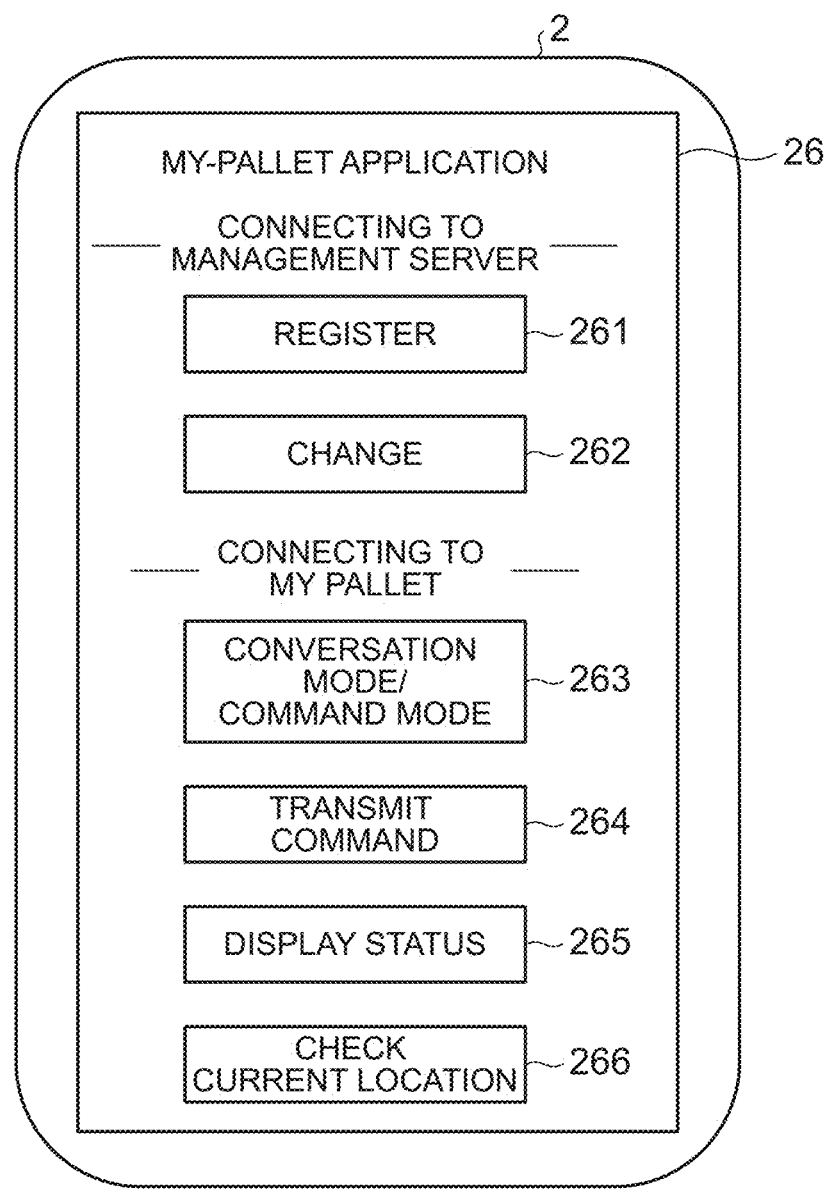
FIG. 11 is a view that illustrates the page of a my-pallet application.

FIG. 11 illustrates the page of a my-pallet application 26 that is displayed on the display of the user device 2. The page of the my-pallet application 26 has graphic objects, such as buttons and icons, corresponding to functions that are operated at the time of a connection to the management server 3 and functions that are operated at the time of a connection to the EV pallet 1 that is my pallet that the user uses. However, the configuration of FIG. 11 is illustrative. The configuration of the my-pallet application 26 is not limited to that of FIG. 11.

For the functions that are operated at the time of a connection to the management server 3, the my-pallet application 26 has a register button 261 and a change button 262. The register button 261 is a button for the user to submit a request to register any one of the EV pallets 1 in the management server 3 as my pallet. As the user selects the register button 261, the user device 2 submits a request, to the management server 3, for a process of registering my pallet. In the process of registering my pallet, the relation between the user ID of the user and the EV pallet 1 selected by the user as my pallet is registered in the rental pallet management table.

The change button 262 is a button for the user to submit, to the management server 3, a request for a process of changing my pallet currently in use to any other one of the EV pallets 1. As the user selects the change button 262, the user device 2 submits a request, to the management server 3, for the process of changing my pallet. In the process of changing my pallet, the relation of the changed EV pallet 1 is set in association with the user ID of the user in the rental pallet management table.

The register button 261 and the change button 262 for executing the function of a connection to the management server 3 are also displayed on the touch panel display 16A of the EV pallet 1 other than the user device 2. Therefore, the user is allowed to execute the process of registering my pallet and the process of changing my pallet by operating the touch panel display 16A of the EV pallet 1 without using the user device 2.

For the functions that are operated at the time of a connection to my pallet, the my-pallet application 26 has a conversation mode/command mode button 263, a command transmission button 264, a status indication button 265, and a current location checking button 266.

The conversation mode/command mode button 263 is a button to switch between a conversation mode and a command mode each time the button is depressed. In the conversation mode, the EV pallet 1 acquires user's voice through the microphone 1F, 6 executes natural language processing, accepts an instruction issued by user's voice, responds to the user, and executes the instructed process. In the command mode, the EV pallet 1 accepts user's input command through, for example, the user device 2 or the touch panel display 16A of the EV pallet 1. The conversation mode/command mode button 263 may be omitted. When no conversation mode/command mode button 263 is provided, the EV pallet 1 should constantly accept both an instruction issued by user's voice and an input command.

The command transmission button 264 is a button to transmit a command that is user's instruction from the user device 2 to the EV pallet 1 that is my pallet. For example, the user device 2 displays a list of commands on the touch panel, accepts user's selection of a command, and transmits the selected command to the EV pallet 1. Examples of the commands include a moving command and a checkout command. The moving command is used to instruct the EV pallet 1 to move to the current location of the user device 2, a point specified by the user, or the like. The checkout command is used to cause the EV pallet 1 to execute a checkout process after shopping.

The status indication button 265 is a button to display the current status of the EV pallet 1 that is my pallet. As the status indication button 265 is operated, the user device 2 displays the current status obtained from the EV pallet 1 that is my pallet. Examples of the current status include the level of the secondary battery 1D (or the range of the EV pallet 1), a distance traveled to date after being charged, detected values of the various sensors, and images from the cameras 17 or other devices. The current location checking button 266 is a button to instruct the EV pallet 1 to inform the current location at which the EV pallet 1 that is my pallet is located.

Process Flow

Figure 12:
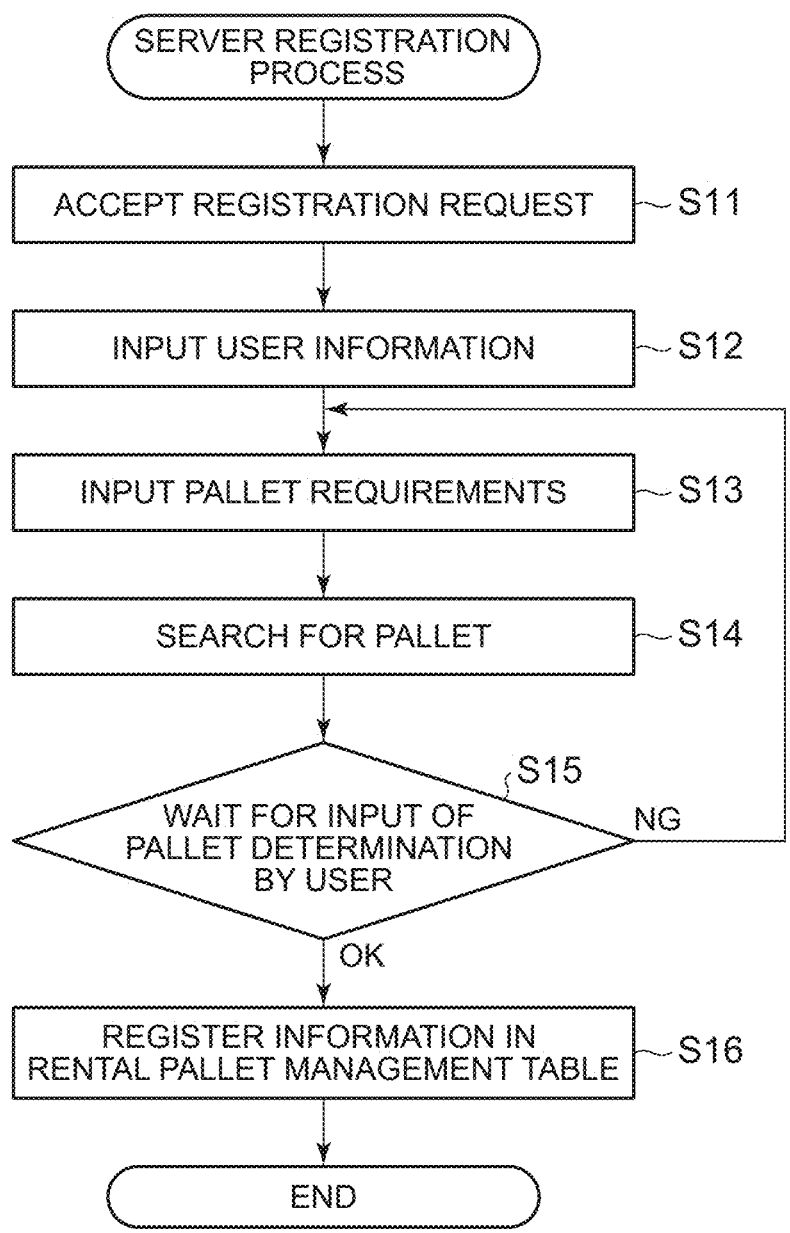
FIG. 12 is a flowchart that illustrates a registration process.

Hereinafter, a process flow in the transport system of the present embodiment will be described with reference to FIG. 12 to FIG. 19. FIG. 12 is a flowchart that illustrates a registration process that is executed by the management server 3. The registration process is a process in which, in response to a request from a user, the management server 3 registers any one of the EV pallets 1 that are managed by the management server 3 as my pallet of the user who is a request source. The management server 3 executes the registration process with the accepting unit 301 (FIG. 6).

In the registration process, the management server 3 accepts a request for registration from the user device 2 or any one of the EV pallets 1 (S11). For example, the user submits a request for registration to the management server 3 through the page of the my-pallet application 26 on the user device 2. However, the user may submit a request for registration to the management server 3 through a page on the touch panel display 16A of any one of the EV pallets 1. The CPU 31 of the management server 3 operates as the accepting unit 301 through the process of S11, and may be regarded as accepting a use request to use any one of a plurality of mobile units.

After that, the management server 3 requests input of user information onto the page of the my-pallet application 26 on the user device 2 (or the page on the touch panel display 16A of the EV pallet 1) (hereinafter, simply referred to as user device 2, or the like) (S12). For input of user information, the management server 3 requests input of the user ID and authentication information to the user device 2, or the like. The authentication information is information for verifying that the user ID has been registered in the transport system of the present embodiment. Examples of the authentication information include a password, and biometric authentication information, such as images of face, vein, fingerprint, and iris.

Registration of the user ID is desirably performed at a shop at which the user rents any one of the EV pallets 1 or a store front of a management company, or the like, that manages rental of the EV pallets 1. For this reason, when the user ID has not been registered in the transport system of the present embodiment, the management server 3 prompts the user to register the user ID, and the like. However, in an operation to the page of the my-pallet application 26 on the user device 2, or the like, the management server 3 may temporarily register any one of the EV pallets 1, and may additionally officially register the EV pallet 1 when the EV pallet 1 is passed over to the user.

Subsequently, the management server 3 accepts input of requirements for the EV pallet 1 (hereinafter, pallet requirements) that the user rents as my pallet (S13). Examples of the pallet requirements include the type or application, size, full-charge range, rent start date, and scheduled return date of the EV pallet 1. After that, the management server 3 searches the pallet management database 304 for the EV pallet 1 that meets the input pallet requirements (S14).

The management server 3 displays the search result on the user device 2, or the like, and waits for user's determination (S15). When the result of user's determination is NG, the management server 3 prompts input of pallet requirements again, calls for resetting of pallet requirements (S13), and executes processes from S14. At this time, the management server 3 may prompt the user to make a cancellation in order for the user to give up registration through the page of the my-pallet application 26. On the other hand, when the result of user's determination is OK, the management server 3 registers the user ID, the pallet ID of the OK EV pallet 1, a rent start date, and a scheduled return date in the rental pallet management table (FIG. 8) (S16).

However, instead of the processes of S13 to S15, the user may select the EV pallet 1 of his or her choice at a shop at which the user rents any one of the EV pallets 1 or a store front of a management company, or the like, that manages rental of the EV pallets 1. When the user selects the EV pallet 1 of his or her choice at a shop, or the like, the processes of S13 and S14 may be omitted, and the user should submit a request for registration to the management server 3 with the specified pallet ID of the EV pallet 1 selected by the user. When the user selects the EV pallet 1 of his or her choice at a shop, or the like, the user may omit specification of the pallet ID by submitting a request for registration directly through the touch panel display 16A of the selected EV pallet 1.

Figure 13:
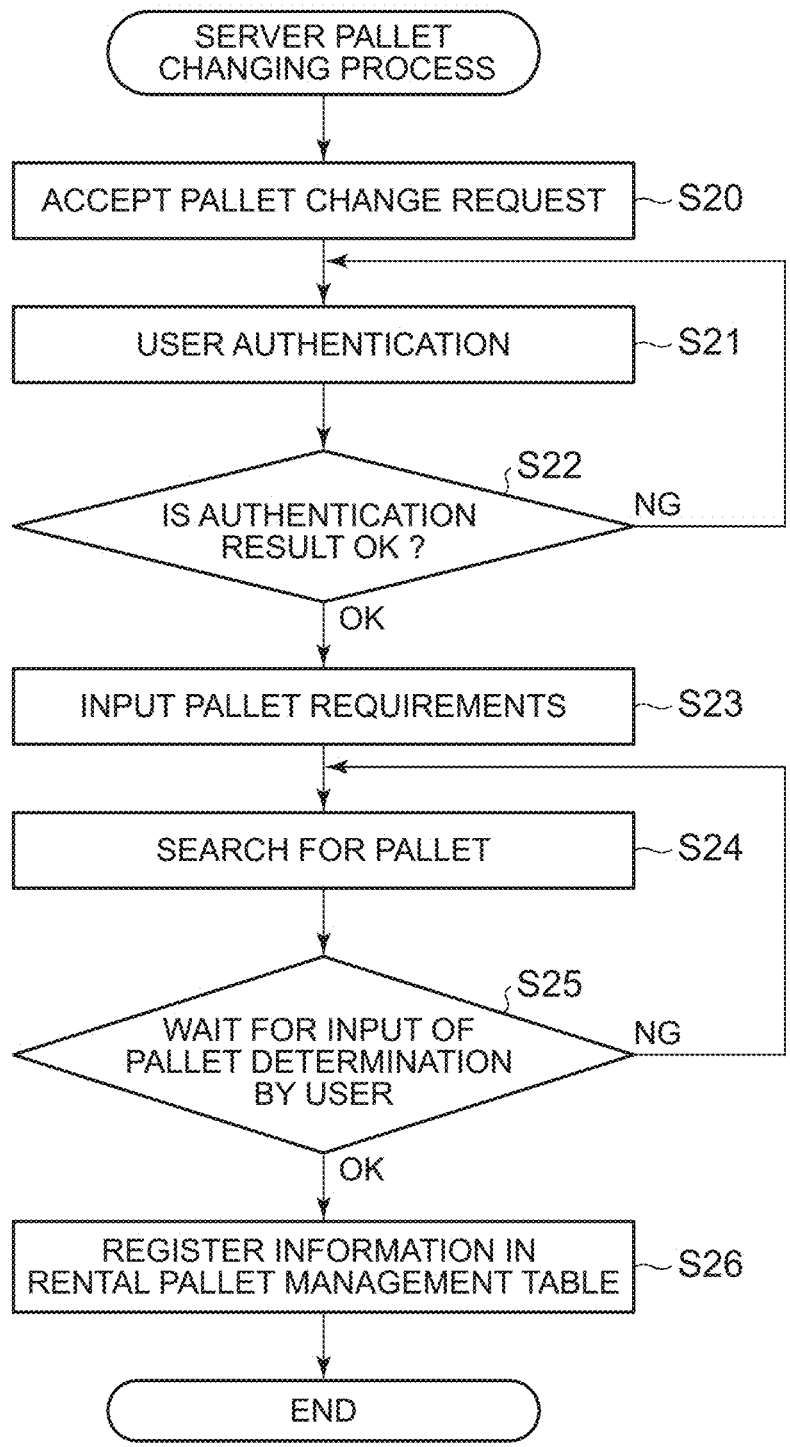
FIG. 13 is a flowchart that illustrates a pallet changing process.

FIG. 13 is a flowchart that illustrates a pallet changing process that is executed by the management server 3. The pallet changing process is a process of changing my pallet that the user is renting to another one of the EV pallets 1. The management server 3 executes the pallet changing process with the accepting unit 301 (FIG. 6).

In the pallet changing process, the management server 3 accepts a pallet changing request from the user device 2 or the EV pallet 1 (S20). For example, the user, as in the case at the time of registration, submits a pallet changing request to the management server 3 through the page of the my-pallet application 26 on the user device 2. However, the user may submit a pallet changing request to the management server 3 through the page on the touch panel display 16A of pre-changed my pallet or new EV pallet 1 that the user desires to newly start using.

After that, the management server 3 performs user authentication (S21). The user authentication is performed based on the user ID and authentication information checked at the time of inputting the user information in the process of S12. When the result of the user authentication is NG, the management server 3 returns to S21, and performs user authentication again. When the user authentication has failed a predetermined number of times or more, the management server 3 may cancel the pallet changing process, may provide a notification to the user identified by the user ID that the user authentication has failed, and may call for user's attention.

When the result of the user authentication is OK, the management server 3 accepts input of pallet requirements for the EV pallet 1 to be used after the EV pallet 1 is changed (S23). The pallet requirements are similar to the pallet requirements at the time of registration of S13. Since the processes of S24, S25, and S26 of FIG. 13 are similar to the processes of S14, S15, and S16 in the registration process (FIG. 12) except an object to be processed is the changed EV pallet 1, the description of the processes of S24, S25, and S26 of FIG. 13 is omitted. The CPU 31 of the management server 3 operates as the accepting unit 301 through the process of S20, and may be regarded as accepting a change request from a user to change a first mobile unit in use to a second mobile unit. The CPU 31 of the management server 3 may be regarded as storing mobile unit identification information of the second mobile unit and user identification information in association with each other in the rental pallet management table that is an example of the usage management unit through the process of S26.

When the user selects the EV pallet 1 of his or her choice at a shop at which the user rents any one of the EV pallets 1 or a store front of a management company, or the like, that manages rental of the EV pallets 1, a change request should be submitted to the management server 3 with the specified pallet ID of the EV pallet 1 selected by the user instead of the processes of S23 to S25. When the user selects the EV pallet 1 of his or her choice at a shop, or the like, the user may omit specification of a new pallet ID by submitting a change request directly through the touch panel display 16A of the selected EV pallet 1.

Figure 14:
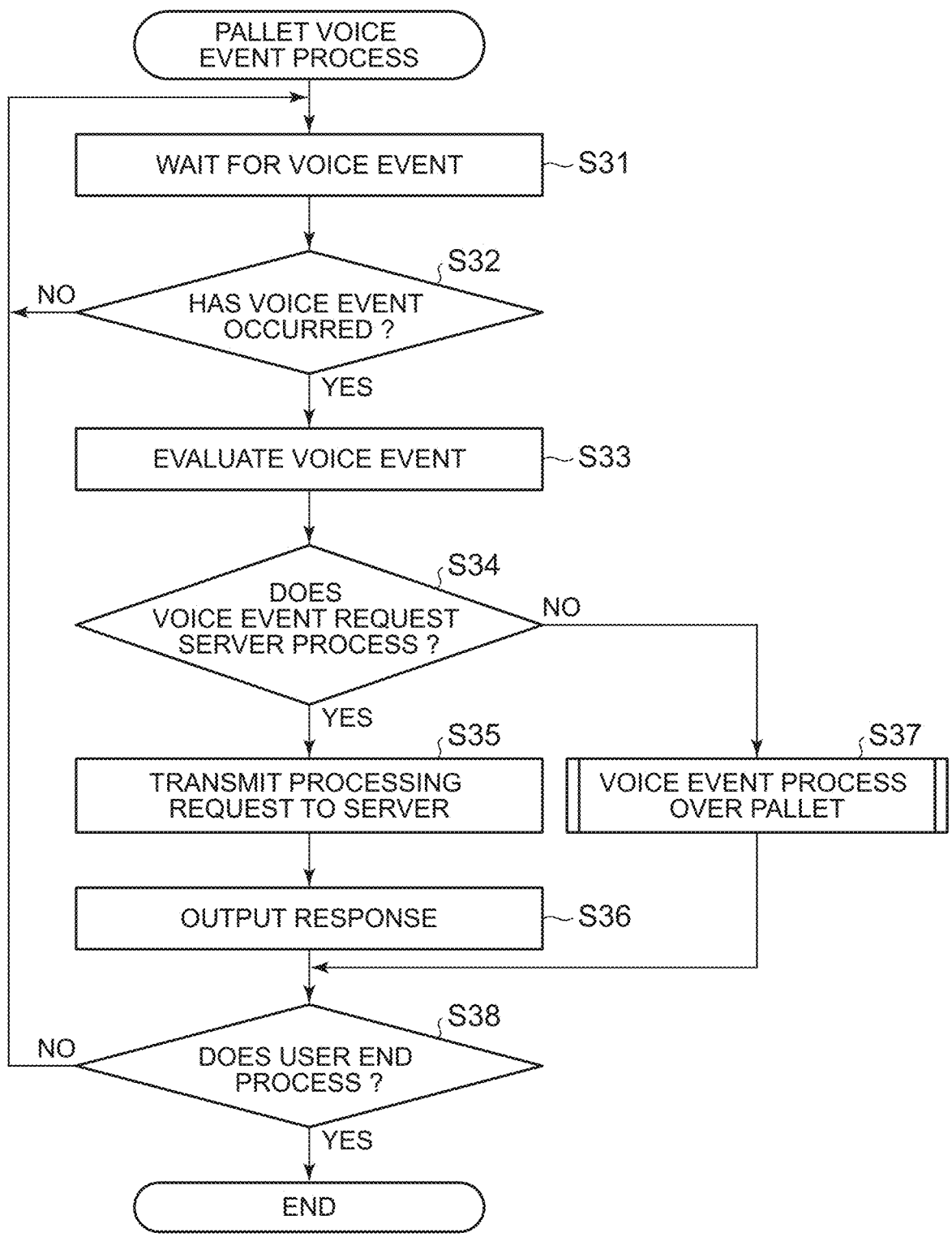
FIG. 14 is a flowchart that illustrates a voice event process.

FIG. 14 is a flowchart that illustrates a voice event process that is executed by the EV pallet 1 registered as my pallet. The voice event process is a process in which the EV pallet 1 analyzes voice that is input through the microphone 1F, accepts user's request, and executes operations in accordance with the accepted request. The voice event process is executed, for example, when the conversation mode has been specified on the page of the my-pallet application 26. However, the EV pallet 1 may constantly execute the voice event process.

In the voice event process, the EV pallet 1 is in a state of waiting for a voice event (S31). A voice event is, for example, information that occurs in the control system 10 of the EV pallet 1 at the time when a change exceeding a predetermined threshold has been detected from voice input through the microphone 1F and that is transmitted to the control system 10 by interrupt, or the like. When no voice event occurs (NO in S32), the EV pallet 1 returns the process to S31.

When a voice event occurs (YES in S32), the EV pallet 1 determines and classifies voice data that is acquired in the voice event (S33). For example, the EV pallet 1 determines whether the voice event is a voice event that requests a process to the management server 3 (S34). When the voice event is a voice event that requests a process to the management server 3, the EV pallet 1 transmits a request for a process to the management server 3 (S35). The EV pallet 1 receives a result of the process that is executed by the management server 3, outputs the received result of the process through the speaker 1G, the displays 16, the touch panel display 16A, or the like, or, for example, drives the steering motor 1B and the drive motor 1C with the control system 10 (S36).

On the other hand, when the EV pallet 1 determines in S33 that the voice event is not a voice event to request a process to the management server 3, the EV pallet 1 executes a voice event process in the EV pallet 1 (S37). After the process of S36 or after the process of S37, the EV pallet 1 asks the user about whether to end the process or asks the user to determine whether the output of the result is satisfactory (S38). When the user does not end the process or the output of the result is not satisfactory, the process returns to S31 in order to ask the user about its cause. On the other hand, when the user ends the process or has input an intention that the output of the result is satisfactory, the EV pallet 1 ends the process.

Figure 15:
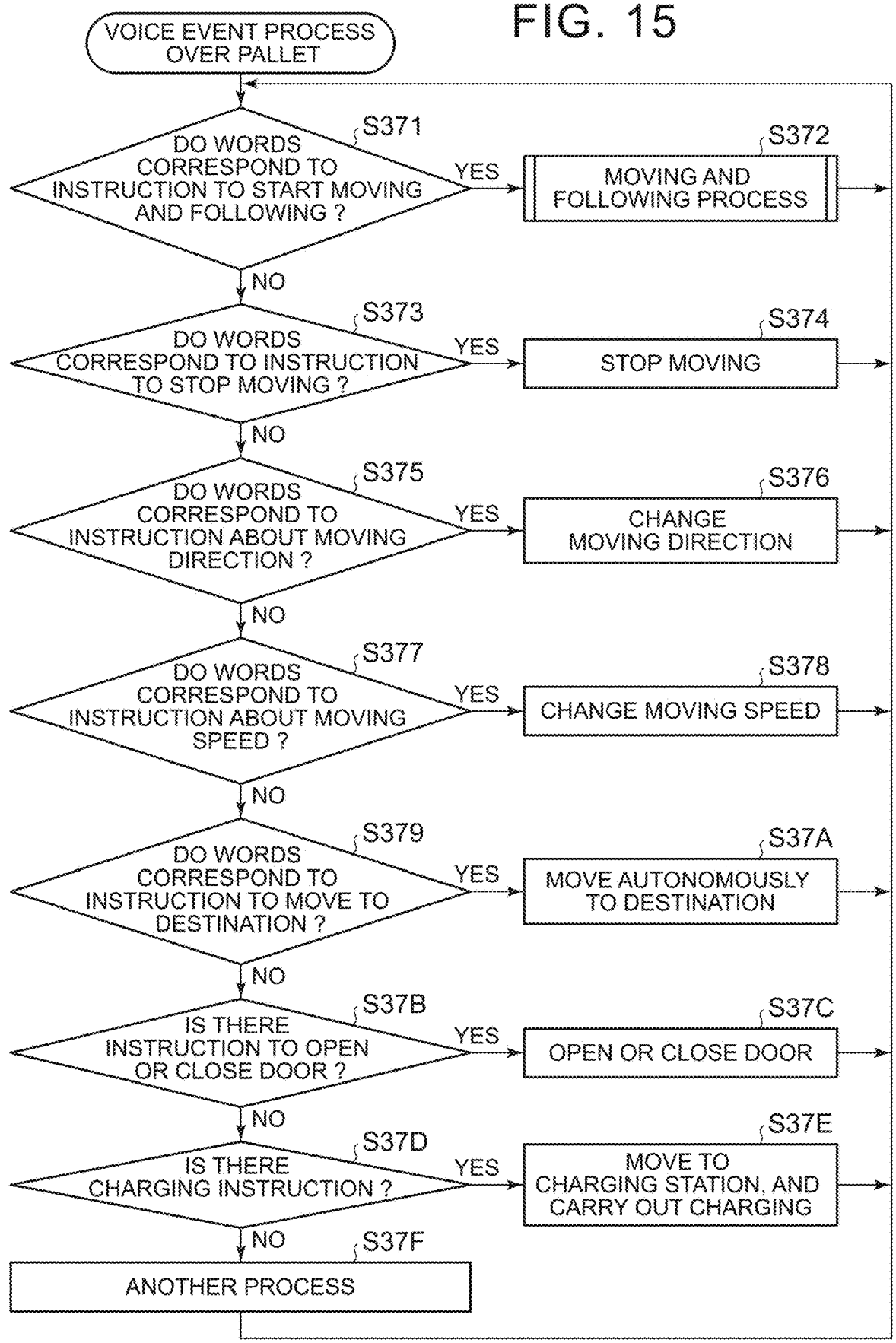
FIG. 15 is a flowchart that illustrates the details of the voice event process, which is executed by the EV pallet.

FIG. 15 is a flowchart that illustrates the details of the voice event process (S37 in FIG. 14) that is executed by the EV pallet 1. In the voice event process that is executed by the EV pallet 1, the EV pallet 1 performs voice recognition on user's voice data acquired as the voice event, and executes a process corresponding to the voice-recognized natural language. The EV pallet 1 acquires not only the voice-recognized words in themselves but also synonyms of the voice-recognized words, and determines whether a process to be executed on the voice-recognized words or the synonyms of the voice-recognized words is prepared in the memory 32. The process of FIG. 15 is illustrative, and the voice event process that is executed by the EV pallet 1 is not limited to the process of FIG. 15.

For example, when voice-recognized words correspond to words to instruct the EV pallet 1 to move or follow the user (YES in S371), the EV pallet 1 executes a moving and following process (S372). Examples of the words to instruct the EV pallet 1 to move or follow the user include "go", "forward", "further forward", and "come with me".

When the voice-recognized words correspond to words to instruct the EV pallet 1 to stop moving (YES in S373), the EV pallet 1 stops moving (S374). Examples of the words to instruct the EV pallet 1 to stop moving include "stop" and "don't move".

When the voice-recognized words correspond to words to instruct the EV pallet 1 about a moving direction (YES in S375), the EV pallet 1 controls the moving direction to the instructed direction (S376). Examples of the words to instruct the EV pallet 1 about the moving direction include "right", "left", "back", "this way", "over there", and "10 meters to the front right side". The words to instruct the EV pallet 1 to change the moving direction may be regarded as, for example, a direction with reference to the traveling direction or a combination of a direction and a distance. The control system 10 of the EV pallet 1 drives the steering motor 1B, detects the steering angle with the steering angle encoder 1A, and controls the moving direction to the instructed direction.

When the voice-recognized words correspond to the words to instruct the EV pallet 1 to change a moving speed (YES in S377), the EV pallet 1 changes the moving speed (S378). Examples of the words to instruct the EV pallet 1 to change the moving speed include "faster" and "slow down". The control system 10 of the EV pallet 1 controls the amount of driving the drive motor 1C, and controls the moving speed while detecting the rotation speed of each wheel with the wheel encoder 19.

When the voice-recognized words correspond to the words to instruct the EV pallet 1 to move to a destination (YES in S379), the EV pallet 1 starts moving autonomous to the destination (S37A). Examples of the autonomous moving to a destination include a process of moving toward the destination in accordance with the map information database stored in the external storage device 14 while avoiding an obstacle present in the traveling direction. Examples of the words to instruct the EV pallet 1 to move to a destination include a combination of words that specify a predetermined point and words that instructs the EV pallet 1 to move. The predetermined point may be specified by address, the name of a facility, or the like. For example, "go to the ticket gate of a station", "move to the entrance of a city hall", or the like, is illustrated.

When the voice-recognized words correspond to words to instruct the EV pallet 1 to open or close the door (YES in S37B), the EV pallet 1 executes a process of opening or closing the door (S37C). When the voice-recognized words correspond to words to instruct the EV pallet 1 to be charged (YES in S37D), the EV pallet 1 searches the map information database stored in the external storage device 14 for a nearby charging station, moves to the found charging station, and carries out charging (S37E).

When the voice-recognized words do not correspond to any of the above-described words, the EV pallet 1 executes a process other than the above-described processes (S37F). For example, the EV pallet 1 may prompt the user to vocalize again and check the instruction. Furthermore, the EV pallet 1 returns the process to S371. Although not shown in FIG. 15, when the voice-recognized words instruct the EV pallet 1 to end the voice event process, the EV pallet 1 should end the process.

Figure 16:
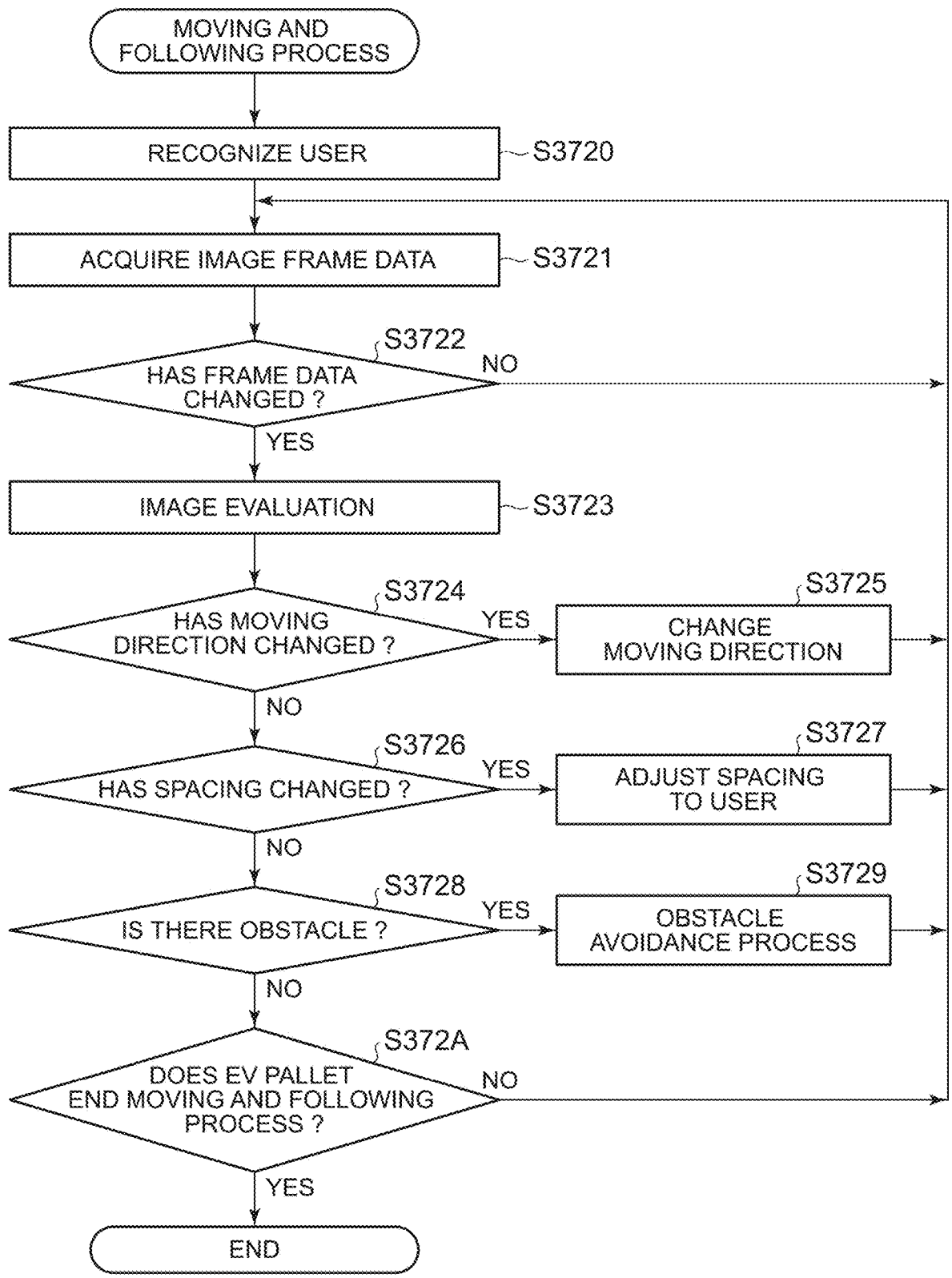
FIG. 16 is a flowchart that illustrates the details of a moving and following process.

FIG. 16 is a flowchart that illustrates the details of the moving and following process (S372 in FIG. 15). In the moving and following process, the EV pallet 1 recognizes the user in the images captured by the cameras 17 (S3720). For example, the EV pallet 1 compares the image of user's face, acquired from the management server 3, with the frame data of the images captured by the cameras 17, identifies the user, and recognizes the location of the user, user's skeletal frame, user's clothes, and the like.

Subsequently, the EV pallet 1 acquires the next frame data of the images captured by the cameras 17 (S3721). For example, in the present embodiment, each camera 17 acquires frame data of an image in units of 1/60 seconds. Therefore, processes from S3721 are repeated every 1/60 seconds.

The EV pallet 1 determines whether the frame data of the images has changed with respect to the last frame data (S3722). When the frame data of the images has no change with respect to the last frame data, the EV pallet 1 returns to the process of S3721. On the other hand, when the frame data of the images has changed with respect to the last frame data, the EV pallet 1 executes an image evaluation process (S3723). The image evaluation process is a process of extracting features from a change in images.

For example, when there is a change in user's moving direction in the frame data of the images (YES in S3724), the EV pallet 1 changes the moving direction in accordance with the user's moving direction (S3725). For example, when the user moves rightward (leftward) in the frame data of the images, the EV pallet 1 also changes the direction rightward (leftward).

For example, when there is a change in distance or spacing to the user in the frame data of the images (YES in S3726), the EV pallet 1 changes the distance or spacing (S3727). For example, as the spacing of the EV pallet 1 to the user extends in the frame data of the images, the EV pallet 1 increases the speed to shorten the distance to the user. For example, when the spacing of the EV pallet 1 to the user shortens in the frame data of the images, the EV pallet 1 decreases the speed to extend the distance until the distance of the EV pallet 1 to the user reaches a predetermined value.

For example, when the EV pallet 1 recognizes an obstacle in the frame data of the images (YES in S3728), the EV pallet 1 executes an obstacle avoiding process (S3729). For example, the EV pallet 1 passes by the right side or left side of the obstacle and follows user's movement.

The EV pallet 1 determines whether to end the moving and following process (S372A). When there is no instruction to end the moving and following process, the EV pallet 1 returns the process to S3721. When the EV pallet 1 receives an instruction to end the moving and following process, the EV pallet 1 ends the process. The EV pallet 1 accepts an instruction through, for example, command input, voice, gesture, or the like, and ends the moving and following process.

Figure 17:
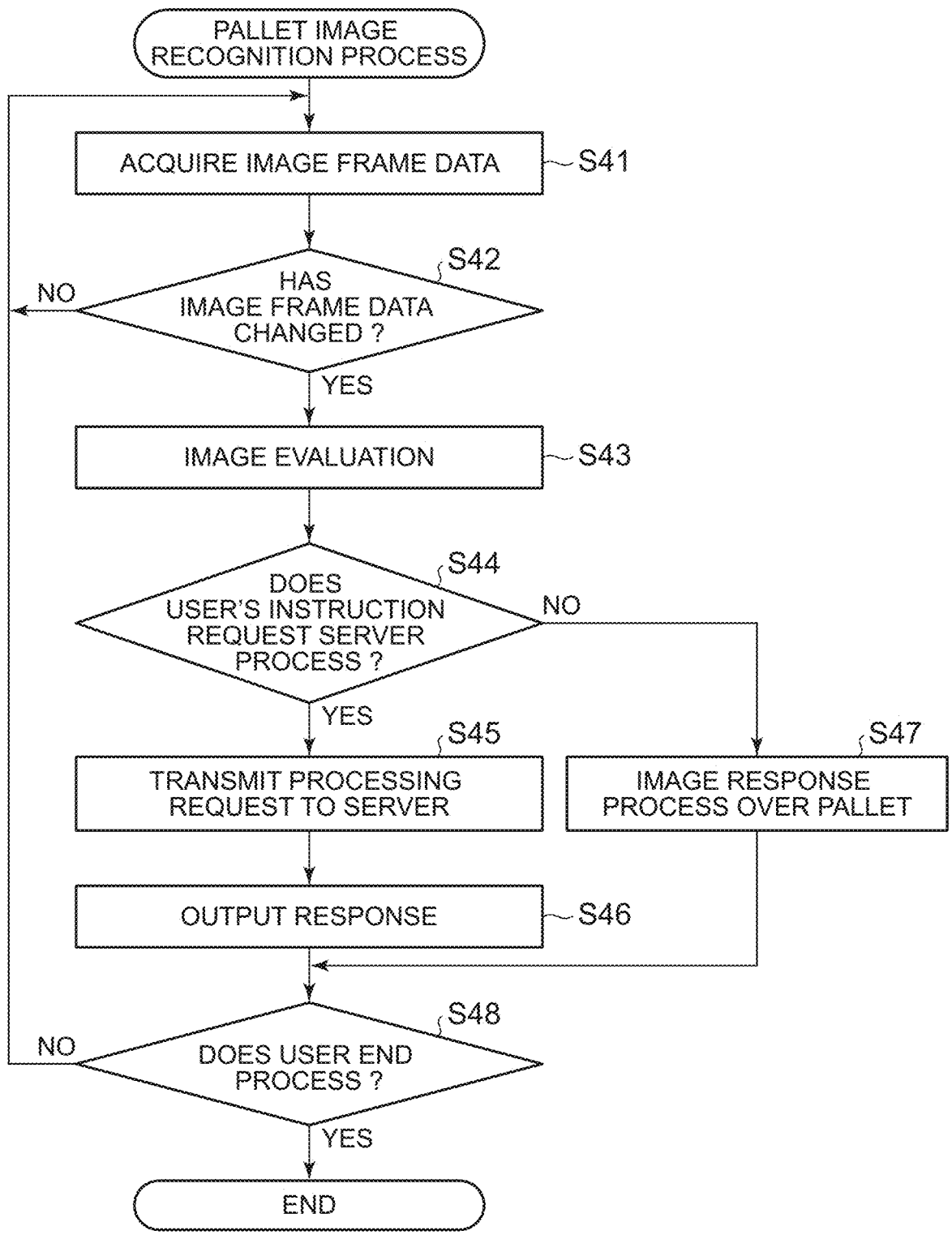
FIG. 17 is a flowchart that illustrates an image recognition process.

FIG. 17 is a flowchart that illustrates an image recognition process that is executed by the EV pallet 1. In the image recognition process, the EV pallet 1 recognizes user's instruction from images captured by the cameras 17. The moving and following process of FIG. 16 and the image recognition process of FIG. 17 should be executed as independent processes in the CPU 11. However, the processes of S3721 to S3723 in FIG. 16 and the processes of S41 to S43 in FIG. 17 may be common processes.

In the image recognition process, the EV pallet 1 acquires frame data of images (S41). Hereinafter, since the processes of S41 to S43 are similar to the processes of S3721 to S3723 in FIG. 16, the description of the processes of S41 to S43 is omitted. However, S43 includes a process in which the EV pallet 1 recognizes user's instruction by analyzing user's gesture.

For example, the EV pallet 1 determines whether user's instruction is an instruction to request a process to the management server 3 (S44). When the use's instruction is an instruction to request a process to the management server 3, the EV pallet 1 transmits a request for a process to the management server 3 (S45). The EV pallet 1 receives a result of the process that is executed by the management server 3, outputs the received result of the process through the speaker 1G, the displays 16, the touch panel display 16A, or the like, or, for example, drives the steering motor 1B and the drive motor 1C with the control system 10 (S46).

On the other hand, when the EV pallet 1 determines in S44 that the user's instruction is not an instruction to request a process to the management server 3, the EV pallet 1 executes an image response process in the EV pallet 1 (S47). After the process of S46 or the process of S47, the EV pallet 1 asks the user about whether to end the process or asks the user to determine whether the output of result is satisfactory (S48). When the user does not end the process or when the output of the result is not satisfactory, the EV pallet 1 returns the process to S41 in order to ask the user about its cause. On the other hand, when the user ends the process or the output of the result is satisfactory, the EV pallet 1 ends the process upon receipt of user's gesture.

Figure 18:
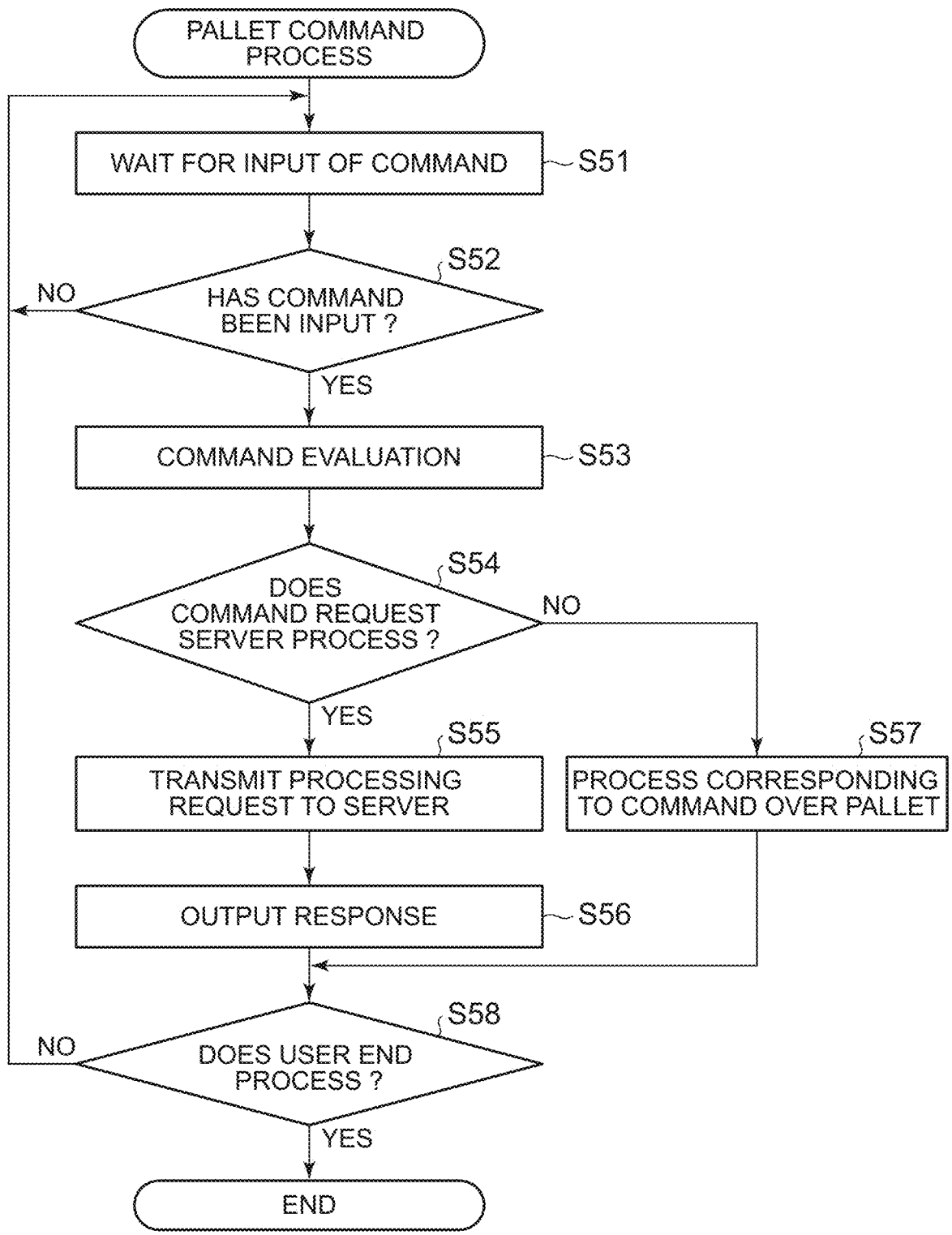
FIG. 18 is a flowchart that illustrates a command process.

FIG. 18 is a flowchart that illustrates a command process that is executed by the EV pallet 1. The command process is a process in which the control system 10 of the EV pallet 1 responds to a command input from the user through, for example, the touch panel display 16A. A command from the user is input to the control system 10 of the EV pallet 1 through an operation to a graphic object of the touch panel display 16A. Examples of the graphic object include a choice of a menu, a radio button, a slider, and an icon. The process of FIG. 18 is executed, for example, when the command mode has been specified on the page of the my-pallet application 26. However, the EV pallet 1 may constantly execute the command process. That is, the process of FIG. 18 may be executed as an independent process of the control system 10 together with the processes of FIG. 15, FIG. 16, and FIG. 17.

In the command process, the EV pallet 1 is in a state of waiting for command input (S51). When the EV pallet 1 detects input of a command (YES in S52), the EV pallet 1 evaluates the input command, and executes a process corresponding to the command (S53). For example, the EV pallet 1 determines whether the command is a command to request a process to the management server 3 (S54). When the command is a command to request a process to the management server 3, the EV pallet 1 transmits a request for a process to the management server 3 (S55). The EV pallet 1 receives a result of the process that is executed by the management server 3, outputs the received result of the process through the speaker 1G, the displays 16, the touch panel display 16A, or the like, or, for example, drives the steering motor 1B and the drive motor 1C with the control system 10 (S56).

On the other hand, when the EV pallet 1 determines in S53 that the command is not a command to request a process to the management server 3, the EV pallet 1 executes a process corresponding to the command in the EV pallet 1 (S57). The process corresponding to the command in the EV pallet 1 is a process executable on the EV pallet 1 alone, and is similar to a process that the EV pallet 1 executes in response to a voice event in FIG. 15. Examples of the process executable on the EV pallet 1 alone include displaying battery level, and opening or closing the door. After the process of S56 or the process of S57, the EV pallet 1 asks the user about whether to end the process (S58). When the user does not end the process, the EV pallet 1 returns the process to S51. On the other hand, when the user has made an input to end the process, the EV pallet 1 ends the process.

Figure 19:
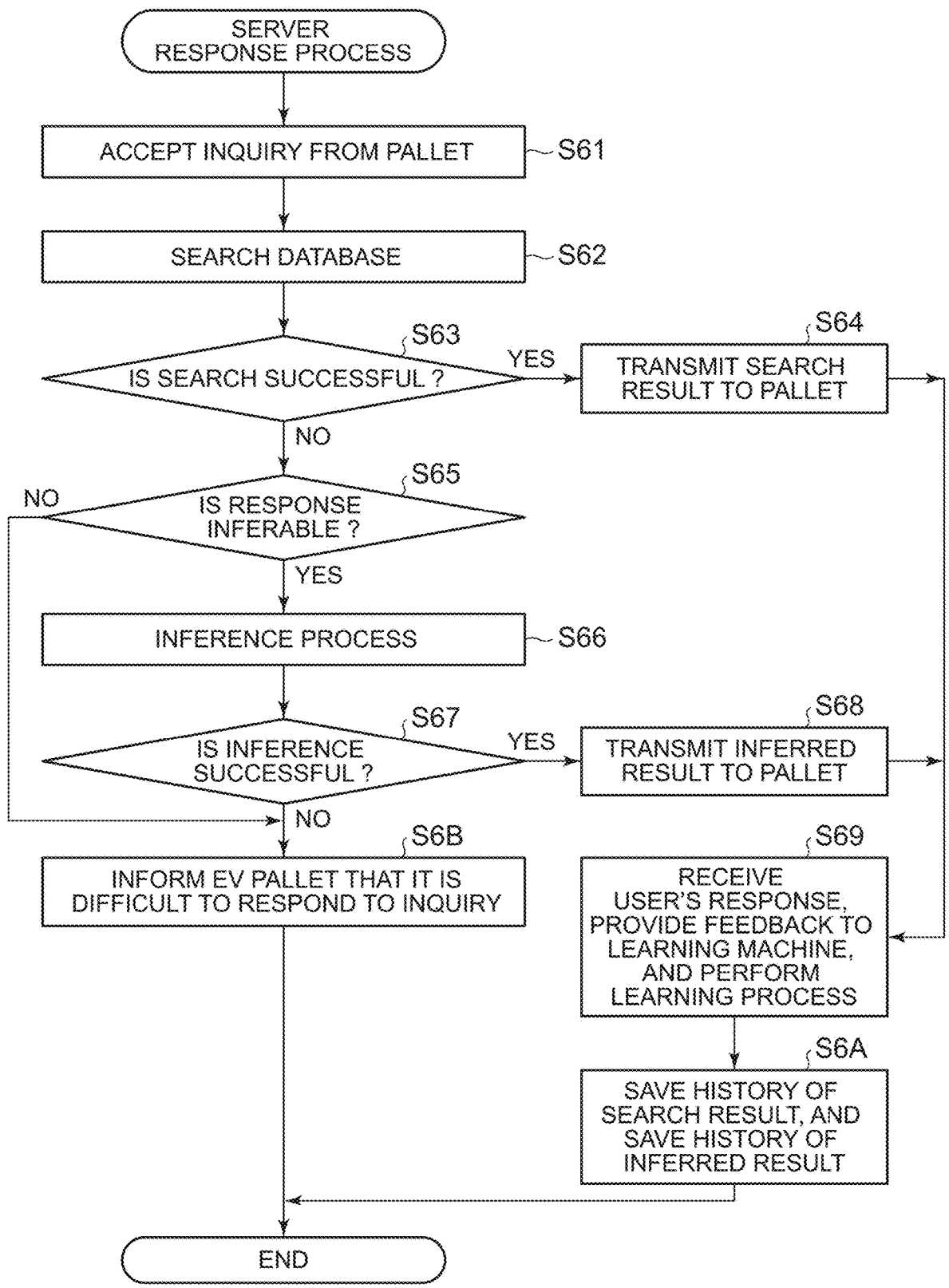
FIG. 19 is a flowchart that illustrates a response process of the management server.

FIG. 19 is a flowchart that illustrates a response process that is executed by the management server 3. The response process that is executed by the management server 3 is a process that is executed by the management server 3 when a request for a process has been transmitted to the management server 3 (S35 of FIG. 14, S45 of FIG. 17, or S55 of FIG. 18). As an example, a process in which the management server 3 accepts an inquiry from the EV pallet 1 (S61) and responds to the inquiry will be illustrated. When the management server 3 accepts an inquiry from the EV pallet 1, the management server 3 extracts a search keyword specified by the inquiry, and searches a database based on the search keyword (S62). Examples of the database to be searched include the pallet management database 304, the user management database 305, the pallet characteristic database 306, and the map information database 307. A search is, for example, a question that occurs at the time when the user does something together with the EV pallet 1 that is my pallet. More specifically, examples of the inquiry include an inquiry about a list of foodstuffs currently stored in the refrigerator R1, information about nearby shops, and tonight's television programs.

When the search is successful (YES in S63), the management server 3 transmits the search result to the EV pallet 1 (S64). On the other hand, when the search is not successful, that is, when the management server 3 is not able to transmit any result for the inquiry through the database search, the management server 3 determines whether a response for the inquiry is inferable. The inferable case is a case where an intended inferred result or recognized result is obtained through, for example, a convolution process with input parameters and weighting factors, deep learning that executes a pooling process in multiple layers, or the like.

When the management server 3 determines that a response for the inquiry is inferable, the EV pallet 1 executes the inference process and the recognition process (S66). An inquiry for which a response is inferable is, for example, a question about a menu of today's dinner. For example, when weighting factors have been already adjusted for a convolution process in which the learning machine 4 performs product-sum operation where a list of foodstuffs in the refrigerator R1 associated with the user ID, user's favorite food, a season, and a history of past suggested menus are set for an input parameter string ($x_i$; $i=1, 2, \ldots$) with the weighting factors $\{w_{i,j,l}$, (here, j is a value of 1 to the number of elements M that are subjected to convolution operation, and l is a value of 1 to the number of layers L)$\}$, the management server 3 causes the learning machine 4 to execute the inference process and the recognition process.

When inference is successful, the management server 3 transmits the inferred result to the EV pallet 1 (S68). For example, a menu of today's dinner, or a menu, a list of food materials in the refrigerator R1, a list of food materials that should be added, and the like, are provided to the user via the EV pallet 1. Furthermore, the management server 3 receives user's response to the result of the inference process and the recognition process, and provides feedback to the learning machine 4 (S69). The learning machine 4 performs deep learning with the input parameter string ($x_i$; $i=1, 2, \ldots$) with the user's response as teaching data, and updates the weighting factors $\{w_{i,j,l}\}$. The weighting factors of deep learning are stored in the pallet characteristic database 306 in association with the user ID.

Subsequently, the management server 3 saves the search result transmitted to the EV pallet 1 in the processes of S62 to S64 or the search result transmitted to the EV pallet 1 in the processes of S66 to S68, in the user management database 305, the pallet characteristic database 306, and the like, in association with the user ID (S6A). At this time, the management server 3 is able to save the search result or the inferred result while incorporating feedback information obtained in the process of S69. For example, the management server 3 should estimate user's taste depending on whether an affirmative intention or negative intention has been returned from the user as feedback in response to the result that the management server 3 has transmitted information about nearby shops or information about tonight's television programs, or the like, to the EV pallet 1, and should update the favorite team, the favorite television program, or the like. The management server 3 should estimate user's taste depending on whether an affirmative intention or negative intention has been returned from the user as feedback in response to the result that the management server 3 has transmitted a suggested menu of today's dinner to the EV pallet 1, and should update the favorite food. In this way, since the attribute information that indicates the updated user's taste is saved in the user management database 305, the pallet characteristic database 306, or the like, in association with the user ID, the management server 3 is able to acquire the user ID associated with the EV pallet 1 in the rental pallet management table in response to an inquiry from the EV pallet 1 and return a response suitable for the attributes of the user ID next time.

The CPU 31 of the management server 3 operates as the processing unit 300 through the processes of S61 to S66, and may be regarded as, in response to a request from a mobile unit that is used by a user, executing a process for the request based on characteristic information that is identified by user identification information associated with mobile unit identification information of the mobile unit. The CPU 31 of the management server 3 may be regarded as transmitting a result of the process to the mobile unit through the processes of S67 and S68. After the pallet changing process of FIG. 13 has been executed by the management server 3, the CPU 31 of the management server 3 may be regarded as, in response to a request from a second mobile unit, executing a process for the request based on characteristic information that is identified by user identification information through the processes of S61 to S68, and transmitting a result of the process to the second mobile unit. The CPU 31 of the management server 3 may be regarded as acquiring feedback information about the result transmitted in response to the request and updating the characteristic information as the processing unit 300 through the process of S69. Through the process of S69, as an example of the characteristic information, information in the pallet characteristic database 306 is made based on interaction between a user and a mobile unit through an information input unit and information output unit of the mobile unit or interaction between the user and the mobile unit through user's terminal.

On the other hand, when the management server 3 determines in S65 that a response is not inferable, or when the management server 3 determines in S67 that inference is not successful, the management server 3 informs the EV pallet 1 that it is difficult to respond to the inquiry (S6B). After that, the management server 3 ends the response process.

Application Example

Figure 20:
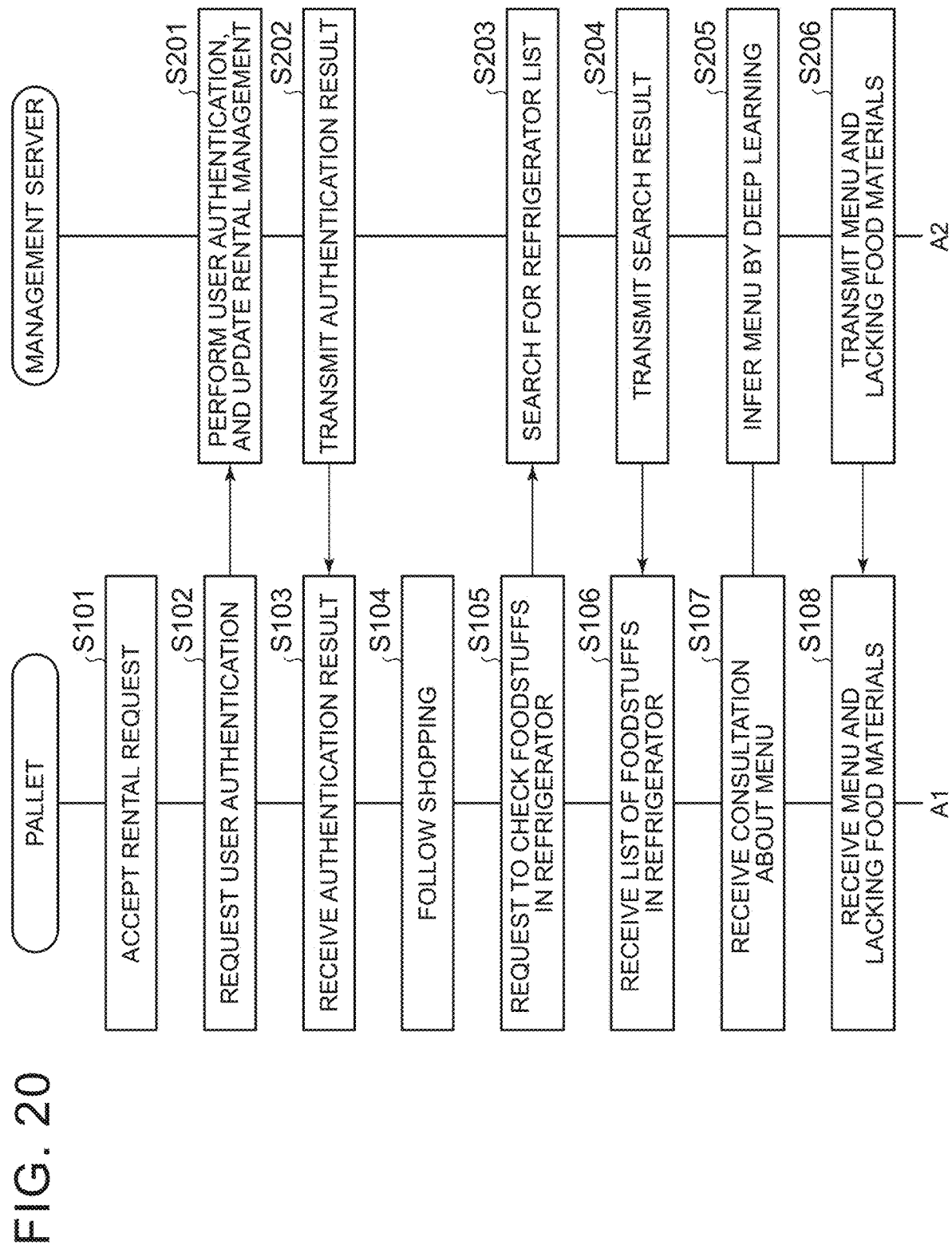
FIG. 20 is a sequence diagram that illustrates a process when the transport system is applied to shopping.
Figure 21:
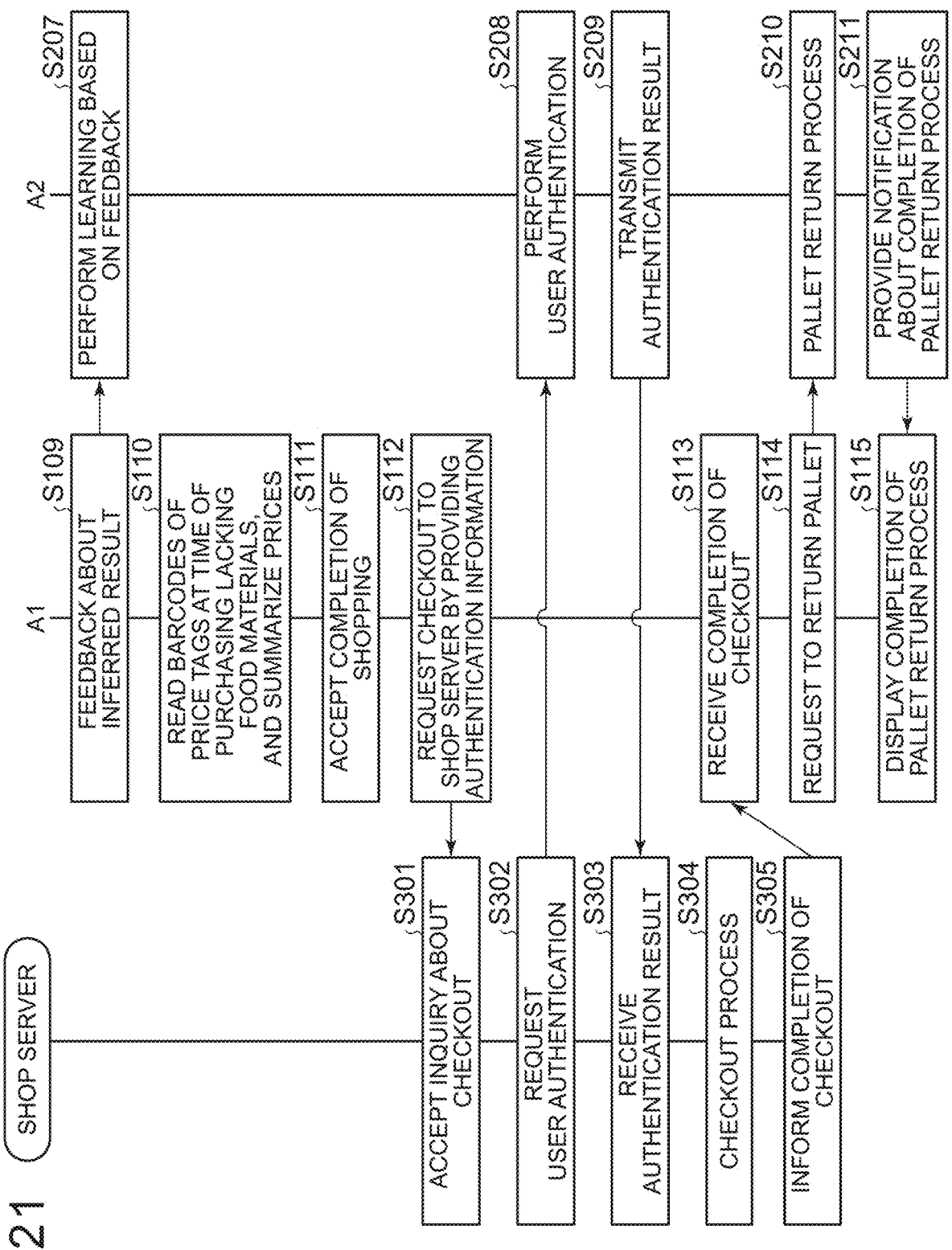
FIG. 21 is a sequence diagram that illustrates a process when the transport system is applied to shopping.

FIG. 20 and FIG. 21 are sequence diagrams that illustrate a process when the transport system is applied to shopping. For example, a user selects any one of the EV pallets 1 at a shop that the user has visited for shopping. The selected EV pallet 1 accepts a rental request through the touch panel display 16A (S101). The EV pallet 1 transmits the pallet ID of the EV pallet 1 to the management server 3 together with the user ID and authentication information input to the touch panel display 16A (S102). After that, the management server 3 performs authentication with the user ID and the authentication information, and, when the authentication is successful, registers the user ID and the pallet ID in the rental pallet management table, and completes a rental management process (S201). Through the process of S201, the EV pallet 1 is registered as my pallet of the user. The management server 3 transmits the authentication result to the EV pallet 1 (S202).

The EV pallet 1 receives the authentication result for an authentication request (S103), and provides the authentication result to the user. When the authentication is successful, the EV pallet 1 starts following user's shopping (S104). For example, the EV pallet 1 receives a request to check foodstuffs in the refrigerator R1 from the user during shopping (S104). After that, the EV pallet 1 transmits, to the management server 3, the request to check foodstuffs in the refrigerator R1 (S105). The management server 3 searches for a list of foodstuffs in the refrigerator R1 (refrigerator list) (S203), and transmits the search result to the EV pallet 1 (S204).

The EV pallet 1 receives the list of foodstuffs in the refrigerator R1 (S106), and provides the list to the user. Subsequently, the EV pallet 1 receives a consultation about a menu from the user (S107). The EV pallet 1 transfers the consultation about a menu to the management server 3. The management server 3 performs deep learning with the learning machine 4 while specifying the list of foodstuffs in the refrigerator R1, the user's favorite food, the past history, and the like, as input parameters, and infers and recognizes a menu that matches the list of foodstuffs in the refrigerator R1 and the user's favorite food (S205). The management server 3 transmits the menu and lacking food materials for the list of foodstuffs in the refrigerator R1 (S206). The EV pallet 1 receives the menu and the lacking food materials for the list of foodstuffs in the refrigerator R1 (S108), and provides the lacking food materials to the user.

The EV pallet 1 receives feedback about the inferred result from the user (S109), and transmits feedback information to the management server 3. After that, the management server 3 performs deep learning based on the feedback information and the input parameters input in inference and recognition, and updates the weighting factors (S207).

On the other hand, the EV pallet 1 reads the barcodes of price tags at the time of purchasing the lacking food materials, and summarizes the prices (S111). The EV pallet 1 may acquire the prices of purchases from IC tags at the time of purchasing the lacking food materials. The EV pallet 1 accepts completion of shopping from the user (S111). After that, the EV pallet 1 provides user's authentication information to a shop server, and submits a shop server authentication request (S112).

The shop server accepts the authentication request (S301), transmits the user's authentication information to the management server 3, and requests authentication (S302). The management server 3 receives the request from the shop server, and performs user's authentication (S208). The management server 3 transmits the authentication result to the shop server (S209).

The shop server receives the authentication result (S303). When the authentication is successful, the shop server executes a checkout process (S304). A checkout is a payment by electric money, a payment by a credit card, a payment by cash, or the like. In the case of a payment by cash, authentication of S302 to S303 may be omitted. After completion of the checkout, the shop server transmits a completion notification to the EV pallet 1 (S305).

The EV pallet 1 receives completion of the checkout (S113), and further transmits a pallet return request to the management server 3 (S114). The management server 3 executes a pallet return process upon the return request (S210). Through the pallet return process, a return date is recorded in a record associated with the user ID and the pallet ID in the rental pallet management table. The management server 3 transmits a notification of completion of the pallet return process to the EV pallet 1 (S211). The EV pallet 1 displays completion of the return process on the touch panel display 16A (S115).

Advantageous Effects of Embodiment

As described above, according to the present embodiment, in the transport system, the management server 3 executes a process in response to a request from the EV pallet 1 with the use of the pallet management database 304, the user management database 305, the pallet characteristic database 306, or the like. More specifically, the management server 3 accepts an inquiry from the EV pallet 1 registered as my pallet of the user, and searches the database based on the user ID associated with the registered EV pallet 1. The management server 3 performs deep learning with information in the database, acquired based on the user ID, as input parameters in cooperation with the learning machine 4, and transmits the recognized result to the EV pallet 1. Therefore, in the transport system, the EV pallet 1 responds to the user in accordance with information that is managed in association with the user ID by the management server 3 on the network N1 or information that is recognized by deep learning, machine learning, or the like, from information that is managed in association with the user ID. Therefore, the EV pallet 1 is able to make a response that matches the attributes of each user to user's request in cooperation with the management server 3.

In this case, since information that is managed in association with the user ID is managed by the management server 3 on the network N1, even when the user changes the EV pallet 1 depending on application or intended use, information in the database is maintained for each user. Therefore, even when the user submits a request for a process to the changed EV pallet 1, the user is allowed to receive a response similar to the pre-changed EV pallet 1. That is, the EV pallet 1 is able to respond to the user in a mode familiar with the user. More specifically, the management server 3 is able to execute the recognition process and the inference process with the use of the weighting factors of deep learning, which have been learned for the user, and responds to the user through the EV pallet 1.

Since the management server 3 of the present embodiment receives user's response to an inferred result and returns feedback to the learning machine 4, the management server 3 is able to execute a learning process with user's response as teaching data, and improve the accuracy of the inference process and the recognition process.

Since the management server 3 of the present embodiment collects environmental information related to user's living environment from the user device 2, the home controller H1, and the like, the management server 3 is able to return information tied closely to user's life to the EV pallet 1.

The management server 3 of the present embodiment receives a request through the touch panel display 16A of the EV pallet 1, the user device 2, or the like, returns a result of a process to the EV pallet 1 in response to the request, and further receives feedback about the result. In this way, the management server 3 accumulates a learned result through interaction between the user and the EV pallet 1 and interaction through the user device 2, and makes information in the user management database 305, the pallet characteristic database 306, and the like. Therefore, when the user rents any one of the EV pallets 1, it is possible to accumulate the characteristics of response of the EV pallet 1, which match user's taste and characteristics.

Other Alternative Embodiments

In the above-described embodiment, the process of the EV pallet 1 that follows the user is illustrated. The thus configured EV pallet 1 can be the ones for various applications. For example, the EV pallet 1 is usable as a shopping cart. The EV pallet 1 for shopping may be registered as my pallet at a shop, and may be returned to the shop after the end of shopping. The EV pallet 1 for shopping may be registered as my pallet at a shop, and may be caused to transport purchases to home. A checkout of shopping may be performed at, for example, the shop or home. When the user leaves the shop together with the EV pallet 1, approval of a list of purchases should be obtained from a computer of the shop through a camera of the shop, IC tags, or the like. When the EV pallet 1 leaves the shop or has reached user's home, the EV pallet 1 should request a checkout to the computer of the shop.

The EV pallet 1 is also usable as a traveling suitcase. The EV pallet 1 that is used as a traveling suitcase may have a simple configuration with, for example, a limited number of the cameras 17, a limited number of the obstacle sensors 18, or the like. The EV pallet 1 is usable as a vehicle that carries a human or a package. The EV pallet 1 that is used as a vehicle should have an increased number of the cameras 17, an increased number of the obstacle sensors 18, or the like, as compared to the shopping one, and should also have a higher output of the drive motor 1C. The EV pallet 1 is not limited to the one for overland transportation. The EV pallet 1 may also be used for, for example, water-borne transportation or air-borne transportation.

What is claimed is:

1. A transport system comprising:
a plurality of mobile units; and
a management server configured to manage information about a user who uses at least any one of the plurality of mobile units, the management server including
a characteristic database configured to store characteristic information in association with user identification information of the user, the characteristic information including a characteristic that is used when a mobile unit used by the user responds to the user,
a processing unit of the management server configured to,
execute, based on the characteristic information identified by the user identification information, a first process in response to a first request from the mobile unit used by the user, and
transmit a result of the first process to the mobile unit,
a usage management unit configured to store the user identification information and mobile unit identification information in association with each other, the user identification information being information that identifies the user, the mobile unit identification information being information that identifies the mobile unit that is used by the user, and
an accepting unit configured to accept a request to use any one of the plurality of mobile units; wherein:
the plurality of mobile units includes a first mobile unit and a second mobile unit;
the usage management unit is configured to, when the accepting unit accepts a change request with a requirement including at least one of type, application, size, or full-charge range of the second mobile unit, from the user to change the first mobile unit in use to the second mobile unit, store the mobile unit identification information of the second mobile unit matching the requirement and the user identification information of the user in association with each other; and
the processing unit of the management server is configured to execute a second process in response to a second request from the second mobile unit, and to transmit a result of the second process to the second mobile unit.

2. The transport system according to claim 1, wherein:
the processing unit is configured to acquire feedback information about the result transmitted in response to a request including the first request and the second request; and
the processing unit is configured to update the characteristic information based on the feedback information.

3. The transport system according to claim 1, wherein:
the characteristic information includes environmental information related to a living environment of the user; and
the server further includes an environmental information acquisition unit configured to acquire the environmental information from at least one of a terminal of the user and a computer provided in the living environment of the user.

4. The transport system according to claim 1, wherein the characteristic information includes information that is made based on at least any one of interaction between the user and the mobile unit through an information input unit and information output unit of the mobile unit, and interaction between the user and the mobile unit through a terminal of the user.

5. An information processing device configured to manage information about a user who uses at least any one of a plurality of mobile units, the information processing device comprising:

a characteristic database configured to store characteristic information in association with user identification information of the user, the characteristic information including a characteristic that is used when a mobile unit used by the user responds to the user;

a processing unit of a management server configured to, in response to a first request from the mobile unit that is used by the user, execute a first process for the first request based on the characteristic information that is identified by the user identification information, and transmit a result of the first process to the mobile unit;

a usage management unit configured to store user identification information and mobile unit identification information in association with each other, the user identification information being information that identifies the user, the mobile unit identification information being information that identifies the mobile unit used by the user; and an accepting unit configured to accept a request to use any one of the plurality of mobile units, wherein:

the plurality of mobile units includes a first mobile unit and a second mobile unit;

the usage management unit is configured to, when the accepting unit accepts a change request with a requirement including at least one of type, application, size, or full-charge range of the second mobile unit, from the user to change the first mobile unit in use to the second mobile unit, store the mobile unit identification information of the second mobile unit matching the requirement and the user identification information of the user whose change request is accepted, in association with each other; and the processing unit is configured to, execute a second process in response to a second request from the second mobile unit, and to transmit a result of the second process to the second mobile unit.

6. The information processing device according to claim 5, wherein:

the processing unit is configured to acquire feedback information about the result transmitted in response to a request including the first request and the second request; and the processing unit is configured to update the characteristic information based on the feedback information.

7. The information processing device according to claim 5, wherein:

the characteristic information includes environmental information related to a living environment of the user; and the information processing device further includes an environmental information acquisition unit configured to acquire the environmental information from at least one of a terminal of the user and a computer provided in the living environment of the user.

8. The information processing device according to claim 5, wherein the characteristic information includes information that is made based on at least any one of interaction between the user and the mobile unit through an information input unit and information output unit of the mobile unit and interaction between the user and the mobile unit through a terminal of the user.

9. An information processing method that is executed by an information processing device configured to manage information about a user who uses at least any one of a plurality of mobile units, the information processing method comprising:

storing characteristic information in association with user identification information of the user, the characteristic information including a characteristic that is used when the mobile unit that is used by the user responds to the user;

executing a first process, based on the characteristic information that is identified by the user identification information, in response to a first request from the mobile unit used by the user;

transmitting a result of the first process to the mobile unit;

storing user identification information and mobile unit identification information in association with each other, the user identification information being information that identifies the user, the mobile unit identification information being information that identifies the mobile unit used by the user;

accepting, with an accepting unit, a request to use any one of the plurality of mobile units, wherein the plurality of mobile units includes a first mobile unit and a second mobile unit;

when the accepting unit accepts a change request with a requirement including at least one of type, application, size, or full-charge range of the second mobile unit, from the user to change the first mobile unit in use to the second mobile unit, storing the mobile unit identification information of the second mobile unit matching the requirement and the user identification information of the user whose change request is accepted, in association with each other;

executing a second process in response to a second request from the second mobile unit; and transmitting a result of the second process to the second mobile unit.

* * * * *

UNITED STATES PATENT AND TRADEMARK OFFICE
CERTIFICATE OF CORRECTION

PATENT NO. : 10,845,808 B2
APPLICATION NO. : 16/229349
DATED : November 24, 2020
INVENTOR(S) : Yusuke Kaneko et al.

Page 1 of 1

It is certified that error appears in the above-identified patent and that said Letters Patent is hereby corrected as shown below:

In the Specification

In Column 9, Line(s) 3, delete "17" and insert --1Z--, therefor.

In Column 9, Line(s) 13, after "motor", delete "IS" and insert --1B--, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*